（12）United States Patent
Desai et al.

(10) Patent No.: US 11,367,889 B2
(45) Date of Patent: Jun. 21, 2022

(54) ELECTROCHEMICAL STACK WITH SOLID ELECTROLYTE AND METHOD FOR MAKING SAME

(71) Applicant: Palo Alto Research Center Incorporated, Palo Alto, CA (US)

(72) Inventors: Divyaraj Desai, Sunnyvale, CA (US); Scott A. Elrod, Palo Alto, CA (US); Jessica Louis Baker Rivest, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 163 days.

(21) Appl. No.: 15/667,791

(22) Filed: Aug. 3, 2017

(65) Prior Publication Data

US 2019/0044167 A1 Feb. 7, 2019

(51) Int. Cl.
 *H01M 8/10* (2016.01)
 *H01M 8/1072* (2016.01)
 *C01C 1/04* (2006.01)
 *C25B 1/00* (2021.01)

(52) U.S. Cl.
 CPC ............... *H01M 8/10* (2013.01); *C01C 1/04* (2013.01); *C25B 1/00* (2013.01); *H01M 8/1072* (2013.01)

(58) Field of Classification Search
 CPC ...................................................... H01M 8/10
 See application file for complete search history.

(56) References Cited

U.S. PATENT DOCUMENTS

| | | | |
|---|---|---|---|
| 3,650,838 A | 3/1972 | Giner et al. | |
| 4,961,834 A | 10/1990 | Kuhn et al. | |
| 4,966,742 A | 10/1990 | Khoury et al. | |
| 6,712,950 B2 | 3/2004 | Denvir et al. | |
| 7,314,544 B2 | 1/2008 | Murphy et al. | |
| 8,916,123 B2 | 12/2014 | Joshi et al. | |
| 9,540,737 B2 | 1/2017 | Botte | |
| 2004/0029014 A1* | 2/2004 | Hwang | H01M 4/04 429/246 |
| 2004/0072066 A1* | 4/2004 | Cho | H01M 10/052 429/137 |
| 2004/0137330 A1* | 7/2004 | Lee | H01B 1/122 429/246 |
| 2014/0356736 A1* | 12/2014 | Choi | H01M 4/60 429/405 |

FOREIGN PATENT DOCUMENTS

WO　WO 2014/160792 A1　3/2014

OTHER PUBLICATIONS

Ganley, J. C., et al., "Solid State Ammonia Synthesis", Ammonia Fuel Network Conference, Oct. 15, 2007, pp. 1-15.

(Continued)

*Primary Examiner* — Ula C Ruddock
*Assistant Examiner* — Frank A Chernow
(74) *Attorney, Agent, or Firm* — Fay Sharpe LLP

(57) ABSTRACT

An electrochemical stack includes a solid electrolyte membrane as one of the components of a membrane electrode assembly. The membrane may have been formed during stack assembly via an in situ reaction.

20 Claims, 20 Drawing Sheets

(56) References Cited

OTHER PUBLICATIONS

Bartels, J. R., "A feasibility study of implementing an Ammonia Economy", Graduate Theses and Dissertations, Iowa State University, Ames, Iowa, 2008, 111 pages.

Bielawa, H., et al., "The Ammonia-Synthesis Catalyst of the Next Generation: Barium-Promoted Oxide-Supported Ruthenium", Angew. Chem. Int. Ed. 2001, 40, No. 6, pp. 1061-1063.

Kyriakou, V., et al., "Progress in the Electrochemical Synthesis of Ammonia", Catalysis Today 286, 2017, pp. 2-13.

Amar, I. A., et al., "Solid-state electrochemical synthesis of ammonia: a review", J Solid State Electrochem, Apr. 6, 2011, pp. 15:1845-15:1860.

Giddey, S., et al., "Review of electrochemical ammonia production technologies and materials", International Journal of Hydrogen Energy, vol. 38, Issue 34, Nov. 13, 2013, pp. 14576-14594.

Liu, R.Q., et al., "Synthesis of ammonia at atmospheric pressure with $Ce_{0.8}M_{0.2}O_{2-d}$ (M=La, Y, Gd, Sm) and their proton conduction at intermediate temperature", Solid State Ionics 177, 2006, pp. 73-76.

Liu, R., et al., "Comparison of Electrochemical Synthesis of Ammonia by Using Sulfonated Polysulfone and Nafion Membrane with $Sm_{1.5}Sr_{0.5}NiO_4$", Chin. J. Chem., 2010, 28, pp. 139-142.

Amar, I. A., et al., "Electrochemical synthesis of ammonia based on doped-ceria-carbonate composite electrolyte and perovskite cathode", Solid State Ionics vol. 201, Issue 1, Oct. 19, 2011, pp. 94-100.

Li, F.F., et al., "Advances in Understanding the Mechanism and Improved Stability of the Synthesis of Ammonia from Air and Water in Hydroxide Suspensions of Nanoscale $Fe_2O_3$", Inorganic Chemistry, 2014, 53, pp. 10042-10044.

Skodra, A., et al., "Electrocatalytic synthesis of ammonia from steam and nitrogen at atmospheric pressure", Solid State Ionics 180, 2009, pp. 1332-1336.

Murakami, T., et al., "Electrolytic Synthesis of Ammonia in Molten Salts under Atmospheric Pressure", JACS Communications, Dec. 12, 2002, pp. 334-335.

Murakami, T., et al., "Electrolytic ammonia synthesis from water and nitrogen gas in molten salt under atmospheric pressure", Science Direct, Electrochimica Acta 50, 2005, pp. 5423-5426.

Itoh, M., et al., "Ammonia Synthesis Using Atomic Hydrogen Supplied From Silver Palladium Alloy Membrane", Materials Science Forum, ISSN: 1662-9752, vols. 561565, Oct. 2, 2007, pp. 1597-1600.

Huggins, R. A., "Recent Results on Lithium Ion Conductors", Electrochimica Acta, vol. 22, Sep. 1, 1976, pp. 773-781.

V. Alpen, U., et al., "Ionic conductivity in $Li_3N$ single crystals", Applied Physics Letters, vol. 30, No. 12., Jun. 15, 1977, pp. 621-623.

Leib, E. W., et al., "Synthesis and thermal stability of zirconia and yttria-stabilized zirconia microspheres", Journal of Colloid and Interface Science, 448, 2015, pp. 582-592.

Kumar, A., et al., "Scandia stabilized zirconia-ceria solid electrolyte (xSc1CeSZ, 5<x <11) for IT-SOFCs: Structure and conductivity studies", Scripta Materialia, 121, 2016, pp. 10-13.

Tsoga, A., et al., "Gadolinia-Doped Ceria and Yttria Stabilized Zirconia Interfaces: Regarding Their Application for Sofc Technology", Acta mater. 48, 2000, pp. 4709-4714.

Koto, K., et al., "Anion Disorder and Ionic Motion in Lead Fluoride ($\beta$-$PbF_2$)", Solid State Ionics 1, 1980, pp. 355-365.

Igel, J. R., et al., "Electrical properties of the fast-ion conductor lanthanum fluoride", J. Phys. C: Solid State Phys., 15, 1982, pp. 7215-7228.

Tallon, J. L., et al., "The Fast-Ion Transition in FCC Silver Iodide", Solid State Communications, vol. 47, No. 7, 1983, pp. 563-566.

\* cited by examiner

ELECTROCHEMICAL STACK WITH SOLID ELECTROLYTE AND METHOD FOR MAKING SAME

BACKGROUND

Ammonia ($NH_3$) has numerous uses including in fertilizers, as a $CO_2$-free hydrogen carrier, as a reactant to produce other nitrogen-containing compounds, in cleaning products, scrubbing flue gas, etc. Due to its numerous uses, there is an immense demand for ammonia and interest in new technology related to its production.

Today, the Haber-Bosch process is the primary production method for producing ammonia. In the Haber-Bosch process, nitrogen ($N_2$) is reacted with hydrogen ($H_2$) under high temperature (e.g., 380-520° C.) and pressure (e.g., 120-220 bar) conditions in the presence of a metal catalyst (e.g., iron oxide, $FeO_x$) to form ammonia:

$$N_2 + 3H_2 \rightarrow 2NH_3.$$

Unfortunately, the high temperature conditions result in the thermodynamic decomposition of ammonia, thereby reducing ammonia conversion rate. Known ammonia production methods also typically require large capital investment in equipment and maintenance costs due to moving parts.

Process intensification in $NH_3$ production represents a domestic energy savings opportunity of 82 PJ/year. Domestic gas flaring in 2015 resulted in estimated energy losses of 300 PJ and emissions of 7 $Mt_{CO2}$. Using this resource for large-scale inexpensive $H_2$ production is appealing. However, long-distance $H_2$ distribution costs make this impractical. If $H_2$ produced from methane flares was converted to $NH_3$, which is much easier to transport as a liquid, then improved energy savings, emissions avoidance, and energy security would result. Analysis of gas flaring data suggests a methane ($CH_4$)→$NH_3$ plant size of 100 tons per day is required for this scheme, which is challenging to achieve using Haber-Bosch process due to its poor cost scaling. If all US natural gas flares were converted to $NH_3$, this could supply 47% of the domestic production of ammonia (10.3 $Mt_{NH3}$) and make significant inroads into the energy reduction opportunity (66 PJ/year), while simultaneously avoiding associated emissions of 10 $Mt_{CO2}$/year.

The unit processes involved in a typical ammonia synthesis production facility using the Haber-Bosch process are shown in FIG. 1. The process relies on an inexpensive source of hydrogen, which is typically produced using steam reforming. In a steam reformer SR, natural gas (methane, $CH_4$) is reacted with high-pressure steam (100 bar) over a transition metal catalyst (Ni) to produce $H_2$ according to the following reaction:

$$CH_4 + 2H_2O \rightarrow 4H_2 + CO_2.$$

The produced hydrogen is purified using pressure-swing adsorption to remove reactant gases and $CO_2$, and is compressed and passed into the Haber-Bosch synloop HB. Simultaneously, nitrogen is separated from air in an air separation unit ASU using either cryogenic distillation or pressure-swing adsorption and is compressed and enters HB.

The rate-limiting step in the ammonia synthesis pathway is the slow dissociation of the highly stable $N_2$ molecule. Although ruthenium (Ru) catalysts are known to be far more active in nitrogen reduction than other catalysts such as platinum (Pt), they are susceptible to poisoning from $H_2$. Catalyst poisoning refers to the partial or complete deactivation of a catalyst by exposure to a chemical compound. In this case, catalyst poisoning prevents the use of Ru-based catalysts in commercial processes. The state of the art Haber-Bosch process has poor efficiency at small scale and requires large plants (greater than 1000 tons per day) for economic feasibility. Small-scale Haber-Bosch synthesis would require drastic reductions of the synloop cost to economically harness the distributed nature of flared gas. In particular, integration of the ASU and HB synloop would lead to the capital cost of two processes being integrated into a single process equipment, thereby reducing manufacturing cost.

Ammonia is also an important precursor in the synthesis of multiple chemicals such as hydrazine ($N_2H_4$), hydrogen cyanide (HCN), urea ($N_2H_4CO$), acetonitrile and phenol. Distributed ammonia synthesis could be a driver to reduce production costs in these processes.

The need for distributed generation of ammonia using small-scale production facilities makes it desirable to develop new systems and methods for producing ammonia with improved efficiency, especially at small scale. Electrochemical $NH_3$ synthesis approaches hold promise for high efficiency at small scale, but are currently hindered by low $NH_3$-flux and resultant high cost. Work in this area to date involves the use of proton ($H^+$), carbonate ($[CO_3]^{2-}$), hydroxide ($[OH]^-$), oxide ($O^{2-}$) or molten nitride ($N^{3-}$) ion conductors. Protonic transport is typically associated with a very poor faradaic efficiency (<2%) at high overpotential due to parasitic $H_2$ evolution. Although lithium nitride dissolved in molten eutectics produces the highest $NH_3$ flux to date (20 nmol $cm^{-2}$ $s^{-1}$) and faradaic efficiency (72%), it is still too low to be commercially feasible. Hybrid approaches have also been used to enhance the rate of $NH_3$ production by combining electrochemical water electrolysis with a chemical $N_2$ reduction step, but are in a very early stage of development, and offer much lower performance (7.6 mmol $g^{-1}$ $h^{-1}$) than the established Haber-Bosch process (96.5 mmol $g^{-1}$ $h^{-1}$, ZA-5 catalyst).

The reaction rate for ammonia synthesis is dependent upon the concentration of the feed gases, and has an inverse dependence on the $H_2$ and $NH_3$ partial pressure. The reaction rate is given by the following equation below.

$$r_{NH_3} = k P_{N_2}^{0.8} P_{H_2}^{-0.7} P_{NH_3}^{-0.4}$$

Enhancement of the reaction rate requires operation under reduced partial pressure or $H_2$ and high $N_2$ partial pressure. Molten electrolytes are particularly unfavored due to their inability to sustain a differential pressure. For this reason. Operation at intermediate pressure is also desirable to reduce energy costs for compression of reactant gases. solid electrolytes are typically used in solid-state ammonia synthesis. However, ceramic electrolytes are typically brittle materials with low fracture toughness that cannot be machined or cut easily, making them particularly susceptible to cracking due to mechanical stresses during assembly. Additionally, ionic oxide membranes typically require high operating temperatures (e.g., 800 to 1,000° C.) and are prone to thermal stresses during repeated periods of start-up and shutdown.

Tape-casting is the preferred route for fabricating ceramic membranes. This involves preparing ceramic slurry comprising ceramic particles in an appropriate liquid, casting it into a thin film (tape), which is sintered at a high temperature. It is desirable to fabricate the membrane in-situ inside the electrochemical cell, such that this fragile material does not need further handling and is mechanically protected by the cell. This enables the use of much thinner membranes, which enhances energetic performance and decreases system cost.

The tape cast membranes are typically many times larger than the characteristic particle size, which reduces their ionic area-specific resistance (ASR) and gas impermeability. For example, sintered lithium-containing membranes typically have relatively low ionic conductivity relative to bulk or single-crystal films. Sintered membranes from ceramic materials also exhibit reduced electrochemical and gas permeability compared to bulk films, all of which are undesirable characteristics for ion-transport membranes. It is desirable to fabricate a solid ceramic ion conductor as a fully dense membrane that enables high polycrystalline ionic conductivity. Additionally it is also desirable to create thinner membranes with membrane thickness comparable to the characteristic length of a crystalline grain, such that conductivity approaches single-crystalline conductivity. The improved ionic conductivity and reduced thickness both result in an improved system performance and reduced capital costs.

Another process improvement in ammonia synthesis is the reduction in the operating temperature. In this regard, the Haber-Bosch synloop suffers from an unfavorable thermodynamic equilibrium, and the single-pass efficiency is typically low due to spontaneous ammonia decomposition. Intermediate temperature operation (<300° C.) is desirable to ensure a high $NH_3$ conversion efficiency.

Fast ion conducting membranes are also used for other applications that are unrelated to ammonia synthesis. Specific examples involve stabilized zirconia membranes ($Y_2O_3$, $Sc_2O_3$, $Gd_2O_3$ stabilizers) for oxide transport in fuel cells, lead fluoride ($\beta$-$PbF_2$) or lanthanum trifluoride ($LaF_3$) membrane for fluoride transport in ion-sensitive electrodes, silver iodide (AgI) for silver ion transport. There are currently no approaches for the direct synthesis of bulk films of these materials. Densified, gas-impermeable membranes of these specific materials would enable improved performance in the associated electrochemical processes.

BRIEF DESCRIPTION

The present disclosure relates to a solid electrolyte membrane and methods for making and using the same.

Disclosed, in some embodiments, is a method for forming an electrochemical stack comprising: assembling a precursor stack comprising: a metal layer comprising a reactant metal; and introducing a reactant gas into the precursor stack, wherein the reactant gas reacts with the reactant metal to form a solid electrolyte membrane in situ.

In some embodiments, the solid electrolyte membrane comprises a nitride; and wherein the reactant metal comprises at least one element selected from the group consisting of lithium (Li), sodium (Na), magnesium (Mg), calcium (Ca), strontium (Sr), and barium (Ba).

The reactant metal may be lithium.

In some embodiments, the reactant gas comprises at least one gas selected from the group consisting of nitrogen ($N_2$) and ammonia ($NH_3$).

The solid electrolyte membrane may comprise a metal oxide or a mixed-metal oxide.

In some embodiments, the reactant metal comprises one or more elements selected from the group consisting of zirconium (Zr), yttrium (Y), scandium (Sc), cerium (Ce), and gadolinium; and the reactant gas is oxygen ($O_2$) or ozone ($O_3$).

The solid electrolyte membrane may comprise a fluoride, a sulfide, or an iodide; and the reactant gas may comprise fluorine ($F_2$), iodine ($I_2$), or hydrogen sulfide ($H_2S$).

In some embodiments, the reactant gas is introduced to the electrochemical stack at a temperature in the range of from 25° C. to 800° C. For example, the temperature may be in the range of from 100° C. to 325° C. for a lithium nitride membrane; from 25° C. to 800° C. for a yttria, scandia, ceria, gadolinia, or zirconia membrane; from 100 to 325° C. for a lead fluoride or lanthanum fluoride membrane; or 185 to 325° C. for a silver iodide membrane.

The reactant gas may be introduced to the electrochemical stack at a pressure in the range of from 1 bar to 10 bar.

In some embodiments, the precursor stack further comprises a first catalyst electrode layer and a second catalyst electrode layer; wherein at least one of the first catalyst electrode layer and the second catalyst electrode layer comprises a ruthenium (Ru) catalyst.

Disclosed, in other embodiments, is a method for forming a solid electrolyte membrane, the method comprising: providing a metal layer comprising a reactant metal; and providing a reactant gas to react with the reactant metal to form the solid electrolyte membrane.

In some embodiments, the solid electrolyte membrane is formed in situ in an electrochemical cell.

The reactant metal may be selected from the group consisting of lithium (Li), magnesium (Mg), aluminum (Al), calcium (Ca), strontium (Sr), barium (Ba), or a mixture thereof.

In some embodiments, the reactant metal is lithium.

The reactant gas may comprise at least one gas selected from the group consisting of nitrogen ($N_2$) and ammonia ($NH_3$).

A solid electrolyte membrane produced by the method is also disclosed.

Disclosed, in further embodiments, is a system comprising a solid electrolyte membrane for an electrochemical stack; wherein the solid electrolyte membrane is formed by an in situ chemical reaction between a reactant metal and a reactant gas when assembled within the electrochemical stack.

The solid electrolyte formed may be lithium nitride.

Disclosed, in additional embodiments, is an electrochemical device that forms the solid electrolyte membrane in situ.

Also disclosed is a method for transporting nitride ions ($N^{3-}$) across a solid electrolyte (e.g., a solid electrolyte membrane) comprising a metal nitride. The method includes providing nitrogen to a first side of the solid electrolyte, wherein the nitrogen reacts to form nitride ions; and transporting nitride ions across the solid electrolyte. The nitrogen may be provided in any suitable form, including but not limited to $N_2$ and $NH_3$.

In some embodiments, the metal nitride comprises at least one metal selected from the group consisting of lithium (Li), magnesium (Mg), aluminum (Al), calcium (Ca), strontium (Sr), barium (Ba), sodium (Na), or a mixture thereof.

The solid electrolyte may comprise lithium nitride.

In some embodiments, the solid electrolyte is located between a first catalyst electrode layer and a second catalyst electrode layer.

In some embodiments, at least one of the first catalyst electrode layer and the second catalyst electrode layer comprises a ruthenium (Ru) catalyst. The ruthenium catalyst may be an alkali promoted ruthenium catalyst.

In some embodiments, the metal nitride electrolyte was formed in situ in the electrochemical cell.

Disclosed, in other embodiments, is a method for producing at least one nitrogen-containing compound in an electrochemical cell; wherein the electrochemical cell comprises a solid electrolyte membrane, wherein the solid electrolyte membrane comprises a metal nitride and can transport nitride ions; the method comprising: providing nitrogen to a first side of the membrane, wherein the nitrogen reacts to form nitride ions ($N^{3-}$), wherein the solid metal nitride electrolyte is capable of transporting (e.g., permeable to) nitride ions ($N^{3-}$); and providing a reactant to a second side of the membrane, wherein the reactant reacts with nitride ions ($N^{3-}$) to form the at least one nitrogen-containing compound.

The cell may be located in an electrochemical stack comprising a plurality of cells.

In some embodiments, the electrochemical cell is supplied with a hydrogen source and a nitrogen source; the electrochemical cell is integrated with an electricity source; and the method electrochemically produces ammonia.

In some embodiments, the metal nitride is lithium nitride.

The metal nitride may be lithium nitride, the electrochemical cell may further include a first catalyst electrode layer and a second catalyst electrode layer, and at least one of the first catalyst electrode layer and the second catalyst electrode layer may comprise a ruthenium (Ru) catalyst. Optionally, the solid electrolyte membrane may be impermeable to gases. Optionally, only one of the first catalyst electrode layer and the second catalyst electrode layer comprises the ruthenium (Ru) catalyst.

In some embodiments, the electrochemical cell is operated at a temperature in the range of from 150° C. to 250° C.

The nitrogen may be provided to the first catalyst electrode layer at a pressure in the range of from 1 bar to 10 bar.

In some embodiments, the method electrochemically produces hydrazine, hydrazoic acid, or hydrogen cyanide.

Disclosed, in further embodiments, is a method for separating or compressing nitrogen ($N_2$) in an electrochemical cell; wherein the electrochemical cell comprises in sequence: a first current collector; optionally a first gas diffusion layer; optionally a first catalyst electrode layer; a solid electrolyte membrane, wherein the solid electrolyte membrane comprises a metal nitride and can transport nitride ions; optionally a second catalyst electrode layer; optionally a second gas diffusion layer; and a second current collector; the method comprising: providing a composition comprising nitrogen ($N_2$) at a first pressure or partial pressure to a first side of the membrane, wherein the nitrogen reacts to form nitride ions ($N^{3-}$), and wherein the nitride ions react at a second side of the membrane to form nitrogen ($N_2$); and removing nitrogen ($N_2$) at a second pressure or partial pressure from the electrochemical stack through an outlet in the second current collector; wherein the second pressure or partial pressure is greater than the first pressure or partial pressure.

The nitrogen may be provided to the first side of the membrane in a gaseous mixture that further comprises at least one additional gas.

In some embodiments, the first catalyst electrode layer comprises ruthenium; and wherein the second catalyst electrode layer comprises ruthenium.

The composition may consist essentially of nitrogen; and the method may compress nitrogen.

Disclosed, in additional embodiments, is an electrochemical system for transporting nitride ions ($N^{3-}$). The system includes a solid electrolyte membrane comprising a metal nitride and capable of transporting nitride ions.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
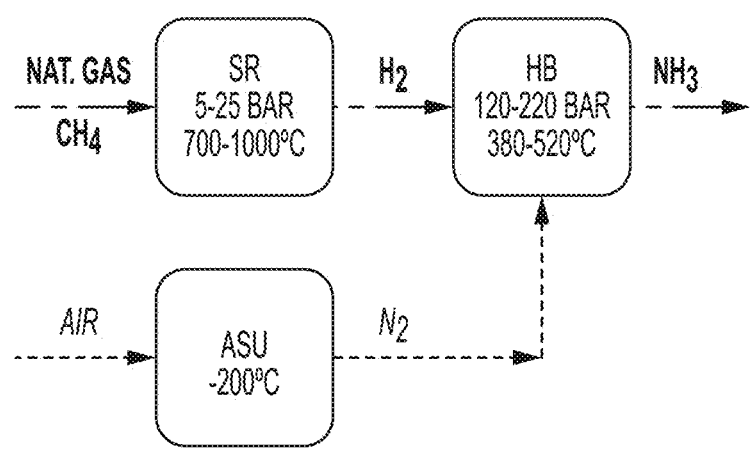
FIG. 1 is a flow chart showing the process steps involved in ammonia synthesis using the Haber-Bosch process.

A more complete understanding of the membranes, stacks, systems, and methods disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. The materials, methods, and articles disclosed herein are illustrative only and not intended to be limiting. For example, lithium nitride solid electrolytes are discussed throughout this application, particularly in the Examples section. However, reactant metals other than lithium are also contemplated. Similarly, ammonia production is discussed throughout this application but other applications are also contemplated.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to electrochemical stacks including a solid electrolyte membrane. Methods for making and using the electrochemical stacks and solid electrolyte membranes are also disclosed. In some embodiments, the membrane comprises a metal nitride, a metal oxide or a mixed-metal oxide, a metal fluoride, a metal iodide, or a metal sulfide.

The lithium nitride (e.g., $Li_3N$) membranes of the present disclosure act as a solid nitride-ion ($N^{3-}$) conducting electrolyte to facilitate ion electromigration under an applied electric field. The membrane is a good ionic conductor at intermediate temperatures ($\sigma_{453K}$=4.5 mS cm$^{-1}$), with a high nitride ion mobility ($t_{N3-}$~0.4).

Metals are generally easier to machine than metal oxides due to their greater sectility and ductility. It is easier to assemble an electrochemical stack starting with a reactive base metal, and minimize the detrimental effects of mechanical stresses during assembly. The production of the ion transport membrane through an in situ reaction reduces the likelihood of membrane failure as a result of physical membrane cracking.

Additionally, membranes made using the systems and methods of the present disclosure retain the properties of bulk films, and are more polycrystalline in nature. This results in lithium nitride membranes with ionic conductivities approaching single-crystal values, which are significantly higher than values for sintered lithium.

The membrane can be combined with catalyst electrodes to form a membrane electrode assembly (MEA), which is the building block of the highly modular electrochemical stack. The membrane is synthesized by reacting Li metal sheet and $N_2$ gas, which occurs in situ once the membrane electrode assembly (MEA) has been assembled, which will lend itself to reel-to-reel processing, simplifying stack assembly and dramatically reducing fabrication costs.

The electrochemical stacks of the present disclosure may be used to produce a variety of nitrogenous chemicals when the membrane comprises a metal nitride. For example the electrochemical stack may produce hydrazine ($N_2H_4$), hydrazoic acid ($HN_3$), or ammonia, which may be produced through the overall reactions below. The reaction products are determined by the choice of catalyst and operating conditions of voltage, gas composition and temperature. This enables the on-demand synthesis of these chemicals using much less hazardous intermediates.

$$3N_2 + H_2 \rightarrow 2NH_3$$

$$2N_2 + H_2 \rightarrow N_2H_4$$

$$N_2 + 3H_2 \rightarrow 2NH_3$$

The intermediate temperature operation and the use of a $N^{3-}$ conducting solid electrolyte avoids the two primary problems in current ammonia generation technologies:

1. low ammonia conversion due to thermodynamic ammonia decomposition at high temperatures in the Haber-Bosch Process; and 2. low ammonia conversion due to parasitic hydrogen evolution in electrochemical processes.

The modular stack design has no moving parts and a much lower capital cost than state-of the-art ammonia generation processes such as Haber-Bosch for small-scale $NH_3$ generation. This small-scale ammonia generation enables the harnessing of energy that is currently lost during natural gas flaring or curtailed renewables.

During operation, feed gases ($N_2/H_2$) enter the Modular Electrochemical Generation of Ammonia (MEGA) stack, maintained at intermediate temperature (e.g., from about 200 to about 250° C.). The thermodynamic decomposition of $NH_3$ at this temperature is avoided by operating at a moderate hydrostatic pressure (e.g., less than about 5 bar). The separation of the feed gases using a solid membrane enables the use of $N_2$-selective Ru catalysts without risk of $H_2$ poisoning. At the cathode, $N_2$ is reduced ($\frac{1}{2}N_2 + 3e^- \rightarrow N^{3-}$) and $N^{3-}$ migrates across the membrane and reacts with $H_2$ ($3/2H_2 + N^{3-} \rightarrow NH_3 + 3e^-$) to produce $NH_3$.

MEGA's modularity is well-suited for use in conjunction with wind farms or gas flares, which vary considerably by location and intensity. The MEGA stack may be integrated with a small-scale steam reformer and air separation unit.

A preliminary cost model to assess the production cost assumes a scaling exponent of 0.6 for small-scale steam reformer (SR) and air separation unit (ASU) plants and no cost for flared gas. The resulting $NH_3$ cost using MEGA compares favorably to a much larger Haber-Bosch facility and allows reduction of $NH_3$ transportation costs for manufacture of fertilizer. For example, the flared gas in North Dakota could be used to supply >40% of the $NH_3$ demand in the Corn Belt. Process optimization during the integration of MEGA, SR, and ASU could result in even more favorable energetics and economics.

Figure 2:
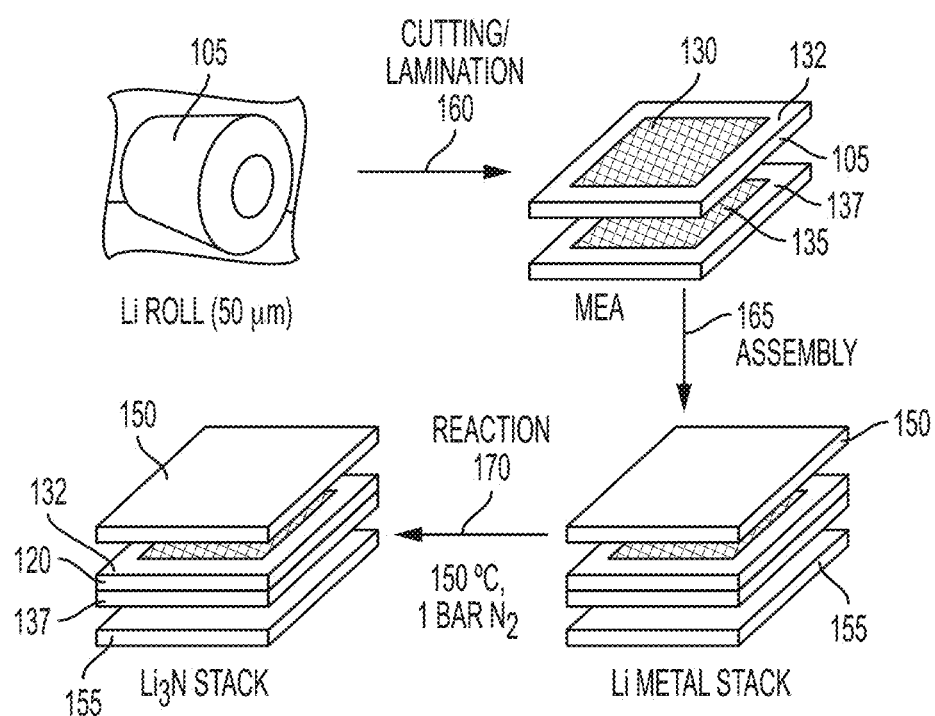
FIG. 2 is a flow chart showing a method for producing an electrochemical stack in accordance with some embodiments of the present disclosure.

FIG. 2 is a flow chart illustrating an exemplary method for producing a solid electrolyte membrane in situ in an electrochemical stack. Initially, a metal metal layer 105 is provided. In the depicted embodiment, the metal layer is provided in the form of a roll. The metal layer 105 is cut and laminated 160 with a first catalyst layer 130, a second catalyst layer 135, and sealing gaskets 132, 137 to form a membrane electrode assembly. The membrane electrode assembly is assembled 165 into a reactive metal stack by the provision of current collectors 150, 155 (e.g., bipolar plates). Finally, reactant gas (e.g., nitrogen gas, ammonia gas, or a nitrogen oxide gas) at relatively low temperature and pressure (compared to the Haber-Bosch process) is provided to the reactive metal stack and reacts 170 with the reactive metal layer to form a solid electrolyte membrane 120 in situ in the electrochemical stack.

In some embodiments, the solid electrolyte membrane comprises a nitride, an oxide, an iodide, or a fluoride ion conductor.

The solid electrolyte membrane is formed by reacting a reactant metal with a reactant gas. The reactant metal can include one or more of the following elements: lithium (Li), sodium (Na), magnesium (Mg), calcium (Ca), strontium (Sr), zirconium (Zr), yttrium (Y), scandium (Sc), cerium (Ce), and gadolinium (Gd).

In some embodiments, the reactant gas comprises nitrogen ($N_2$), ammonia ($NH_3$), oxygen ($O_2$), ozone ($O_3$), hydrogen ($H_2$), or fluorine ($F_2$).

When the membrane comprises a nitride, the reactant metal may contain lithium (Li), sodium (Na), magnesium (Mg), calcium (Ca), and/or strontium (Sr) and the reactant gas may be nitrogen ($N_2$), ammonia ($NH_3$), or hydrazine ($N_2H_4$).

When the membrane comprises an oxide, the reactant metal may contain zirconium (Zr), yttrium (Y), scandium (Sc), cerium (Ce), and/or gadolinium (Gd) and the reactant gas may be oxygen ($O_2$) or ozone ($O_3$).

When the membrane comprises a fluoride, the reactant gas may be fluorine ($F_2$) and the reactant metal may be lanthanum (La) or lead (Pb).

When the membrane comprises an iodide, the reactant gas may be iodine ($I_2$), and the reactant metal may be silver (Ag).

When the membrane comprises a sulfide, the reactant gas may be hydrogen sulfide ($H_2S$) and the reactant metal may be silver (Ag).

Figure 3:
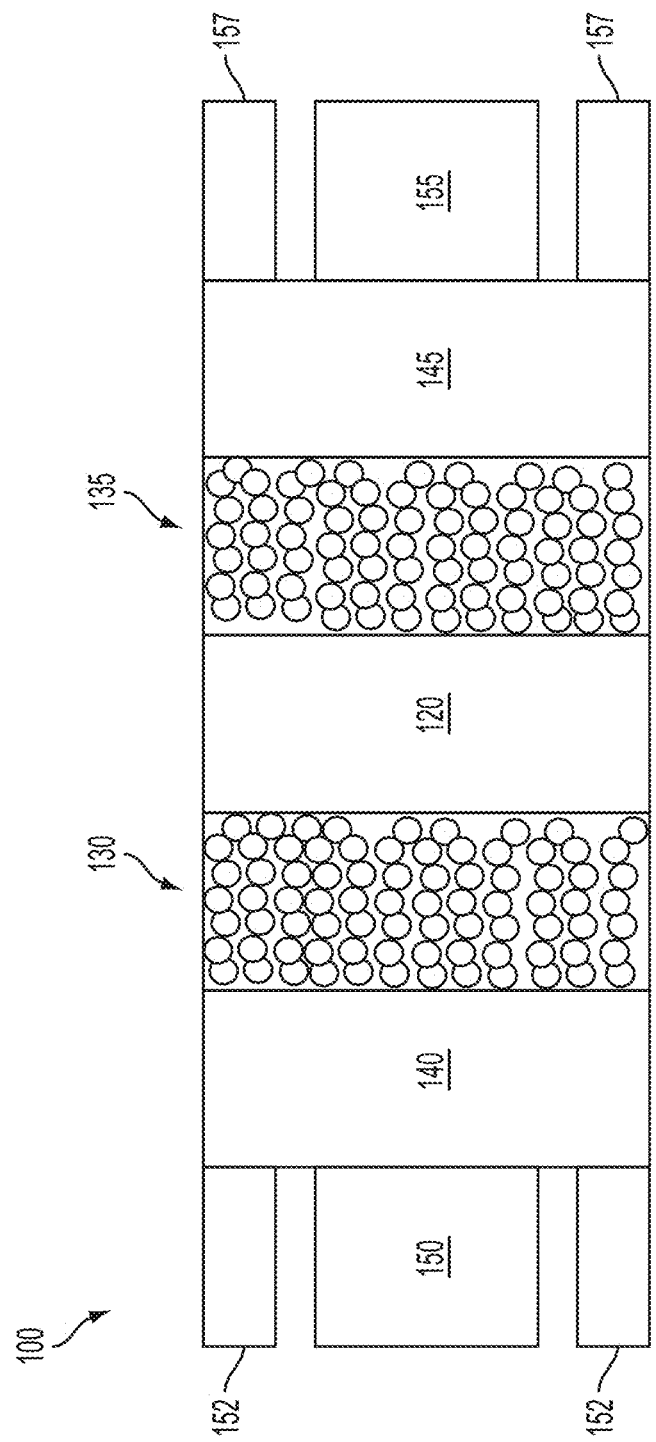
FIG. 3 is a cross-sectional view of an electrochemical stack in accordance with some embodiments of the present disclosure.

FIG. 3 illustrates a non-limiting embodiment of an electrochemical stack 100 in accordance with some embodiments of the present disclosure. The stack 100 includes a solid electrolyte membrane 120 (e.g., a solid metal nitride electrolyte membrane such as a lithium nitride membrane). Catalyst electrode layers 130, 135 are provided on each side of the electrolyte membrane 120. The first catalyst electrode layer 130 is located between the electrolyte membrane 120 and a first, microporous layer 140. The second catalyst electrode layer 135 is located between the electrolyte 120 and a second, microporous layer 145. The first microporous layer 140 is located between the first catalyst electrode layer 130 and a first current collector 150. The second microporous layer 145 is located between the second catalyst electrode layer 135 and a second current collector 155. The current collectors 150, 155 include inlets and outlets 152, 157 for introducing gases.

The electrolyte 120 may have a thickness in the range of from about 50 μm to about 2,000 μm, including from about 50 μm to about 250 μm and from about 50 μm to about 100 μm.

The reactant metal of the metal nitride electrolyte 120 may include at least one metal selected from lithium, magnesium, aluminum, scandium, gadolinium, calcium, cerium, and barium.

In some embodiments, the nitride is a mixed metal nitride (i.e., contains more than one metal). The mixed nitride may contain lithium in combination with one or more metals selected from sodium, potassium, magnesium, aluminum, scandium, gadolinium, calcium, cerium, and barium.

In particular embodiments, the nitride may be a lithium-aluminum nitride ($Li_3AlN_2$).

The performance of the electrochemical cell relies on the electrolyte membrane to have a high ionic conductivity for the nitride ion (e.g., greater than 1 mS/cm), low area-specific resistance (e.g., less than 100 ohm-$cm^2$), and poor electrical conductivity. Additionally, the membrane has very low permeability to gases in order to prevent mixing of the feed gases.

The catalyst layers 130, 135 contain a conductive metal catalyst.

The catalyst layers may have the same composition or different compositions. For example, in applications wherein only one side of the membrane is exposed to hydrogen, the catalyst layer of the unexposed side may contain ruthenium whereas the catalyst layer of the exposed side does not contain ruthenium.

In some embodiments, the catalyst layers 130, 135 independently contain at least one metal selected from gold, iridium, palladium, platinum, and ruthenium.

One or both catalyst layers 130, 135 may consist of ruthenium. In other embodiments, one or both catalyst layers contains ruthenium in combination with at least one metal selected from gold, iridium, palladium, and platinum.

In some embodiments, the catalyst is an alkali promoted catalyst.

The thicknesses of the catalyst layers 130, 135 may be the same or different. The catalyst layer may comprise a catalyst coated gas diffusion electrode (e.g., 250 μm carbon paper or 400 μm carbon cloth). The thickness depends upon the choice of electrode used.

The catalyst layer may ensure a high specific surface area (e.g., from about 10 to about 60 m²/g).

The catalyst-coated gas diffusion electrode enhances the reaction rate by increasing the three-phase (gas, catalyst, and electrolyte) contact area available for reaction while simultaneously providing a path for the easy collection of electrons produced during the reaction. For this reason, the gas diffusion electrode is made of a good electrical conductor such as carbon, covered with a layer of carbon felt to ensure a high surface area. The electrode surface may occasionally be post-treated with a binder (e.g., PTFE) to ensure mechanical stability.

The microporous layers 140, 145 (also known as gas transport or gas diffusion layers) may be the same or different in terms of composition and thickness. These layers are porous to enable transport of gases.

In some embodiments, each microporous layer independently contains a porous material selected from carbon cloth, carbon felt, carbon paper, metal mesh, and metal foam (e.g., nickel).

The gas transport layer has adequate porosity to ensure high gas permeability (e.g., less than 10 s), low electrical area-specific resistance (less than 0.013 ohm-cm², and high tensile strength (greater than 5 N/cm).

In some embodiments, the gas transport layer is covered with a microporous layer (e.g., less than 50 μm thick) made from carbon black. The purpose of this layer is to ensure good areal contact between the gas transport layer and, in PEM fuel cell, encourage the wick-off of produced water. In this embodiment, the microporous layer reduces the electrode's porosity in the vicinity of the solid electrolyte, creating a high capillary pressure to ensure that the lithium nitride does not completely submerge the catalyst.

In some embodiments, the catalyst electrode layers and/or gas transport layers are optional.

In some embodiments, the current collectors are in physical contact with the electrolyte membrane.

In general, the current collectors 150, 155 exhibit good electrical conductivity, high thermal conductivity, high chemical resistance, high corrosion resistance, mechanical stability against compressive forces, and low permeability to the gases used in a particular application (e.g., hydrogen).

The current collectors may contain one or more conductive materials selected from graphite, metals, and metal alloys. In some embodiments, the metal is stainless steel (e.g., Type 304 and/or Type 316), copper, or titanium.

The current collectors generally include one or more flow fields for enhanced gas distribution. In some embodiments, the flow field(s) is/are serpentine.

The current collectors generally have a high electrical conductivity (e.g., greater than 10⁴ S/m), low gas permeability and chemical stability towards the feed and product gases, high tensile strength to allow operation at intermediate pressure (e.g., greater than 5 bar), and good machinability to enable the machining of flow fields.

In some embodiments, each current collector has a thickness within the range of from about 1 to about 5 mm.

The electrochemical stack 100 of FIG. 3 includes a single cell.

Figure 4:
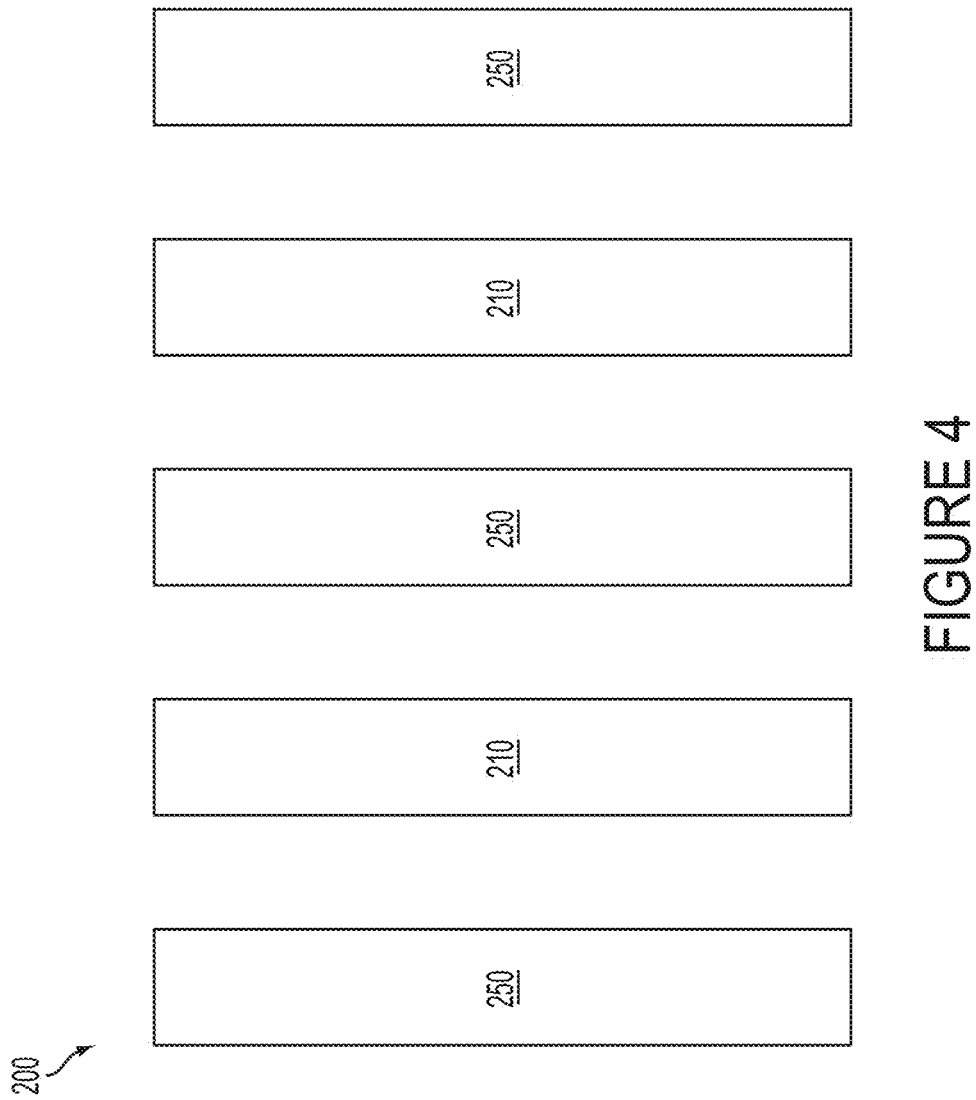
FIG. 4 is an exploded view of another electrochemical stack in accordance with some embodiments of the present disclosure.

However, it should be understood that the electrochemical stacks of the present disclosure may also include a plurality of cells. FIG. 4 is an exploded view illustrating an electrochemical stack 200 with two cells. Each membrane electrode assembly 210 includes a solid electrolyte membrane and catalyst electrodes and is sandwiched between two current collectors 250. In some embodiments, a stack module contains from about 50 to about 100 cells. For example, a 50-cell stack (20 cm×20 cm) operating at a current of 250 mA/cm² may be able to produce 1 kg of ammonia per hour.

Figure 5:
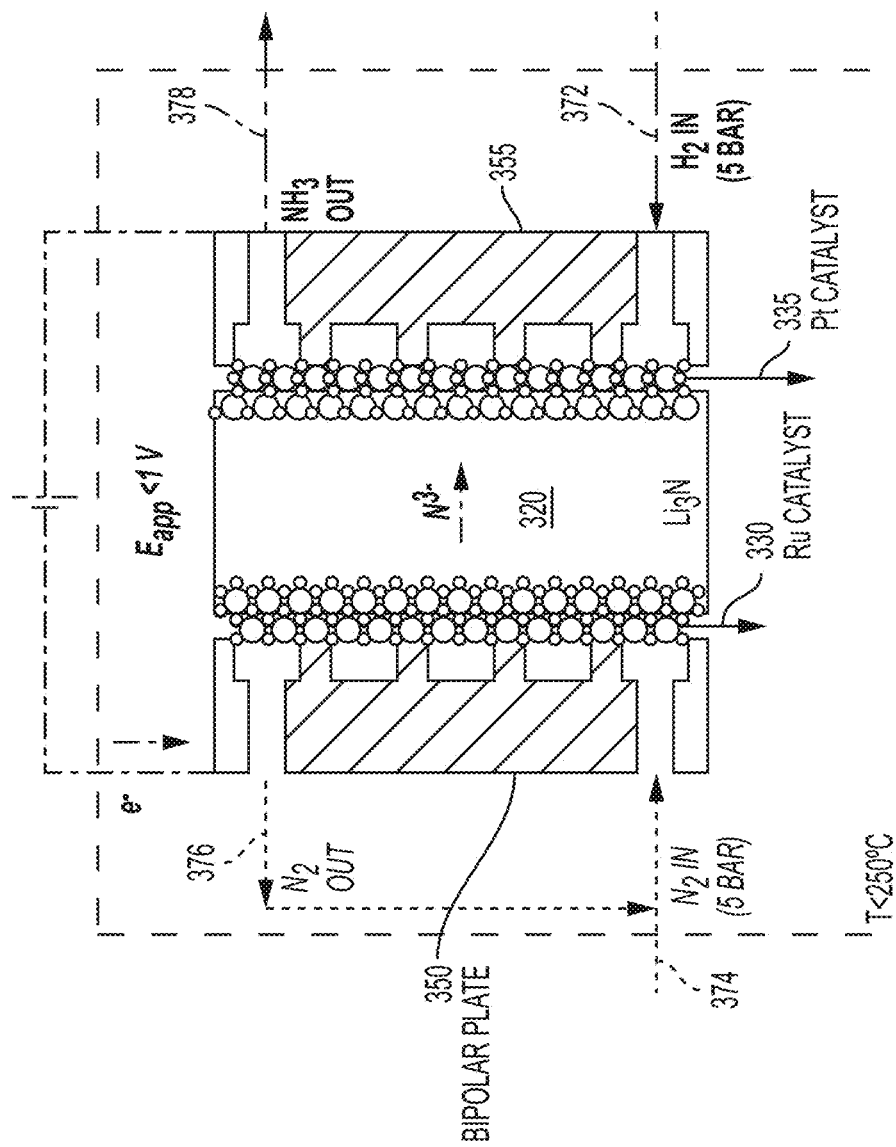
FIG. 5 schematically illustrates ammonia synthesis using a solid-state nitride conducting membrane in accordance with some embodiments of the present disclosure.

In some embodiments, the electrochemical stack is used to produce ammonia. A non-limiting example of an exemplary ammonia production method is schematically shown in FIG. 5. The system includes a solid, metal nitride electrolyte 320, first and second catalyst electrode layers 330, 335, and first and second current collectors 350, 355. In the depicted embodiment, the electrolyte 320 is a lithium nitride electrolyte, the first catalyst electrode layer 330 is a ruthenium catalyst layer, and the second catalyst electrode layer 335 is a platinum catalyst layer. Nitrogen gas is provided through the first current collector 350 via inlet 374 and hydrogen gas is provided through the second current collector 355 via inlet 372. Unreacted nitrogen may be removed via outlet 376 and is optionally recycled. Nitride ions ($N^{3-}$) are generated at the first catalyst layer 330. The electrolyte 320 is selectively permeable to the nitride ions, which pass therethrough. The nitride ions reaching the second catalyst layer 335 react with hydrogen to form ammonia. Ammonia generated in the electrochemical stack may be removed from the system via outlet 378. The solid electrolyte 320 is not permeable to hydrogen. Therefore, the hydrogen provided via inlet 372 does not reach the ruthenium catalyst 330. Thus, the solid electrolyte 320 prevents the deleterious poisoning of the catalyst 330.

The systems and methods of the present disclosure enable distributed generation of ammonia from an underutilized energy source (e.g., natural gas flares, curtailed or stranded renewables such as wind farms and solar farms). During operation, the stack is maintained at an intermediate temperature and the reactant gases ($N_2$ and $H_2$) enter the stack at moderate pressure. In some embodiments, the intermediate temperature is less than about 250° C. The temperature may be in the range of from about 150° C. to about 250° C. In some embodiments, the moderate pressure is less than about 10 bar. The pressure may be in the range of from about 1 bar to about 10 bar. The nitrogen is typically separated from air by cryogenic distillation, membrane separation or pressure swing adsorption. The hydrogen is typically obtained by steam reforming of natural gas at flared gas site or through water electrolysis at a renewable energy farm. When an active voltage is applied, $N_2$ is reduced at the cathode (i.e., first catalyst layer 330 in FIG. 5) at the catalyst surface to form nitride ions ($N^{3-}$):

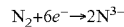

$$N_2 + 6e^- \rightarrow 2N^{3-}$$

The resulting $N^{3-}$ migrates to the anode (i.e., second catalyst layer 335 in FIG. 5) where it reacts with $H_2$ to generate ammonia:

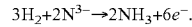

$$3H_2 + 2N^{3-} \rightarrow 2NH_3 + 6e^-.$$

Figure 6:
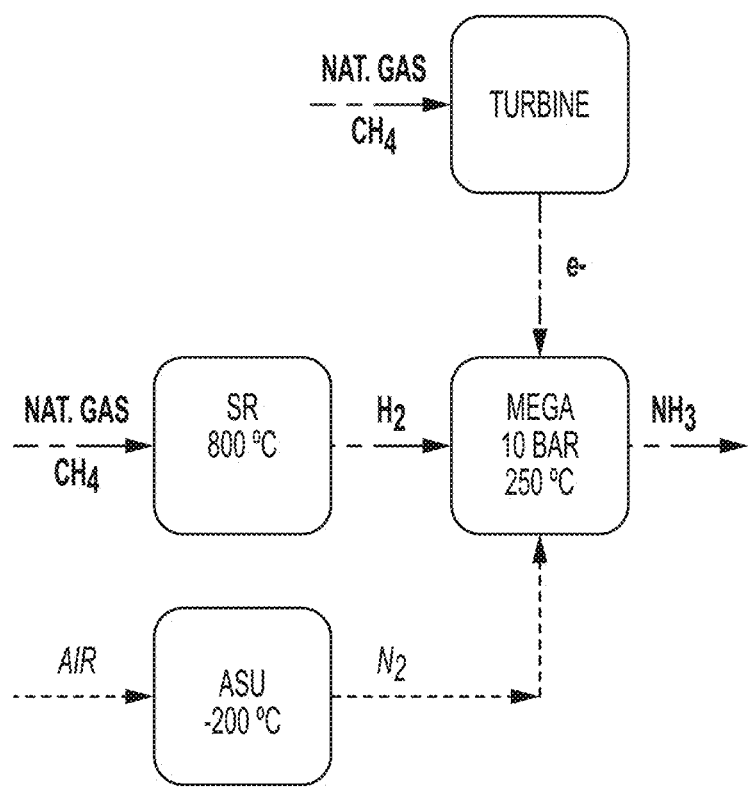
FIG. 6 illustrates system integration of a modular electrochemical ammonia generator stack (MEGA) with a $H_2$ production process (steam reforming, SR), an air separation process (cryogenic distillation) and an electricity generation process (gas turbine) in accordance with some embodiments of the present disclosure.

FIG. 6 is a flow chart illustrating an exemplary system which includes a modular electrochemical ammonia generator stack MEGA. Steam reformer SR may be similar to or different from the steam reformer of FIG. 1 and provides hydrogen to the MEGA stage. Air separation unit ASU may be similar to or different from the air separation unit of FIG. 1 and provides nitrogen to the MEGA stage. A TURBINE stage provides energy to the MEGA stage. In addition or as an alternative to the turbine, energy may be provided by wind or solar power. The MEGA stage produces ammonia at a considerably lower temperature and pressure in comparison to the HB stage in FIG. 1.

Figure 7:
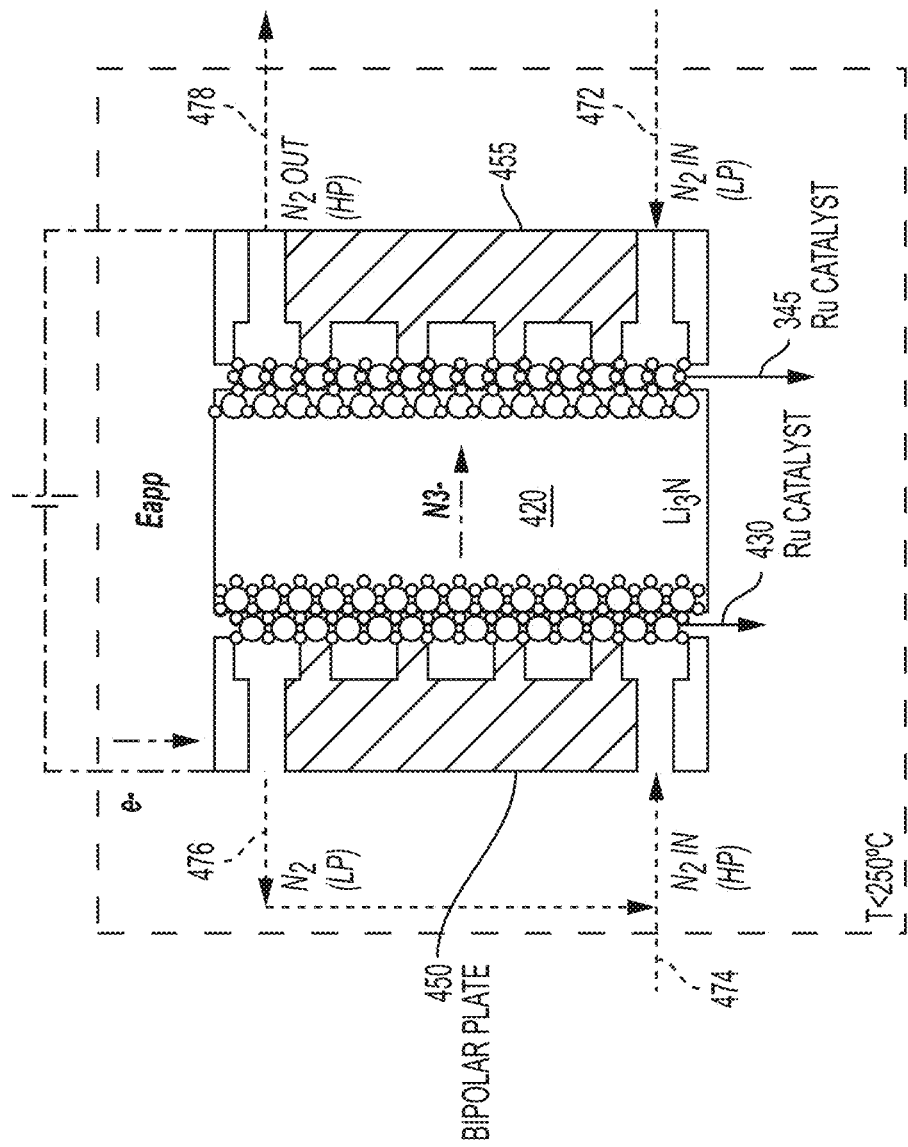
FIG. 7 schematically illustrates nitrogen compression using a nitride-conducting solid membrane in accordance with some embodiments of the present disclosure.

In other embodiments, the electrochemical stack is used to separate nitrogen from an inert gas and/or compress nitrogen. A non-limiting example of an exemplary nitrogen compressing method is schematically shown in FIG. 7. The system includes a solid, metal nitride electrolyte 420, first and second catalyst electrode layers 430, 435, and first and second current collectors 450, 455. In the depicted embodiment, the electrolyte 420 is a lithium nitride electrolyte and the first and second catalyst electrode layers 430, 435 are ruthenium catalyst layers. In this case, ruthenium can be used in both catalyst layers 430, 435 because catalyst poisoning from hydrogen is not an issue since both feeds 472, 474 provide nitrogen to the electrochemical stack. The first inlet 472 provides low pressure nitrogen and the second inlet 474 provides high pressure nitrogen. Low pressure nitrogen is also recycled via recycle line 476. High pressure nitrogen leaves the system via outlet 478. Nitrogen reacts at the first catalyst layer 430 (i.e., cathode) to form nitride ions ($N^{3-}$) which the electrolyte 420 is permeable to. The nitride ions react in a reversible reaction at the second catalyst layer 435 (i.e., anode) to produce more nitrogen, thereby increasing the pressure of nitrogen in the second side of the cell. The reversible reaction at the second catalyst layer is shown below:

$$N_2 + 6e^- \rightleftharpoons N^{3-}.$$

As a result, the gas pressure downstream from the $N_2$ inlet increases. When multiple stages are stacked, the pressure of the product $N_2$ gas can be increased substantially (e.g., to greater than about 100 bar at 250° C.). These conditions are adequate for nitrogen to exist as a supercritical fluid, and the resulting product can be a $N_2$ feed for applications such as supercritical drying, or purification of porous materials.

The systems and methods of the present disclosure may be used to separate $N_2$|inert gas mixtures. Solid electrolyte membranes afford a modular structure that has better cost-scaling for small-scale gas processing applications. One example is the purification of noble gases (Ar, Kr, Ne, Xe). This is currently achieved using adsorption columns or cryogenic distillation, both of which require high installation and operation costs. Polymeric membranes for separation of $N_2$|He suffer from low He selectivity or low flux. The Knudsen selectivity for these gases is low, and polymeric membranes to separate $N_2$|He mixtures require multiple stages and a substantial membrane area. Ion-selective membranes offers much higher selectivity, and are desirable to improve the flux in separation of inert gases.

The compressed $N_2$ may also be used in the production of ammonia.

The separation/compression systems and methods of the present disclosure overcome the deficiencies of the prior art for small scale applications. They may be useful for on-site chemical production, for remote chemical production based on the availability of inexpensive reagents at small scale, for enabling continued production during large plant maintenance, for modular expansion of existing plants, or for low-capital expenditure plants that can scale production based on real-time costs of reagents.

The portable electrochemical nitrogen separators/compressors may be used for delivering portable compressed nitrogen for filling tires in automobiles. Oxide ion transport membranes need a high operating temperature to achieve this task.

The portable electrochemical nitrogen separators/compressors may also be used for delivering high purity $N_2$ to maintain an inert atmosphere (e.g., for storage of combustible or reactant products such as petroleum).

The systems can also function as portable add-ons to ovens and glove boxes to maintain inert conditions without requiring industrial air.

In other embodiments, the electrochemical stacks of the present disclosure may be used to detect ammonia.

Figure 8A:
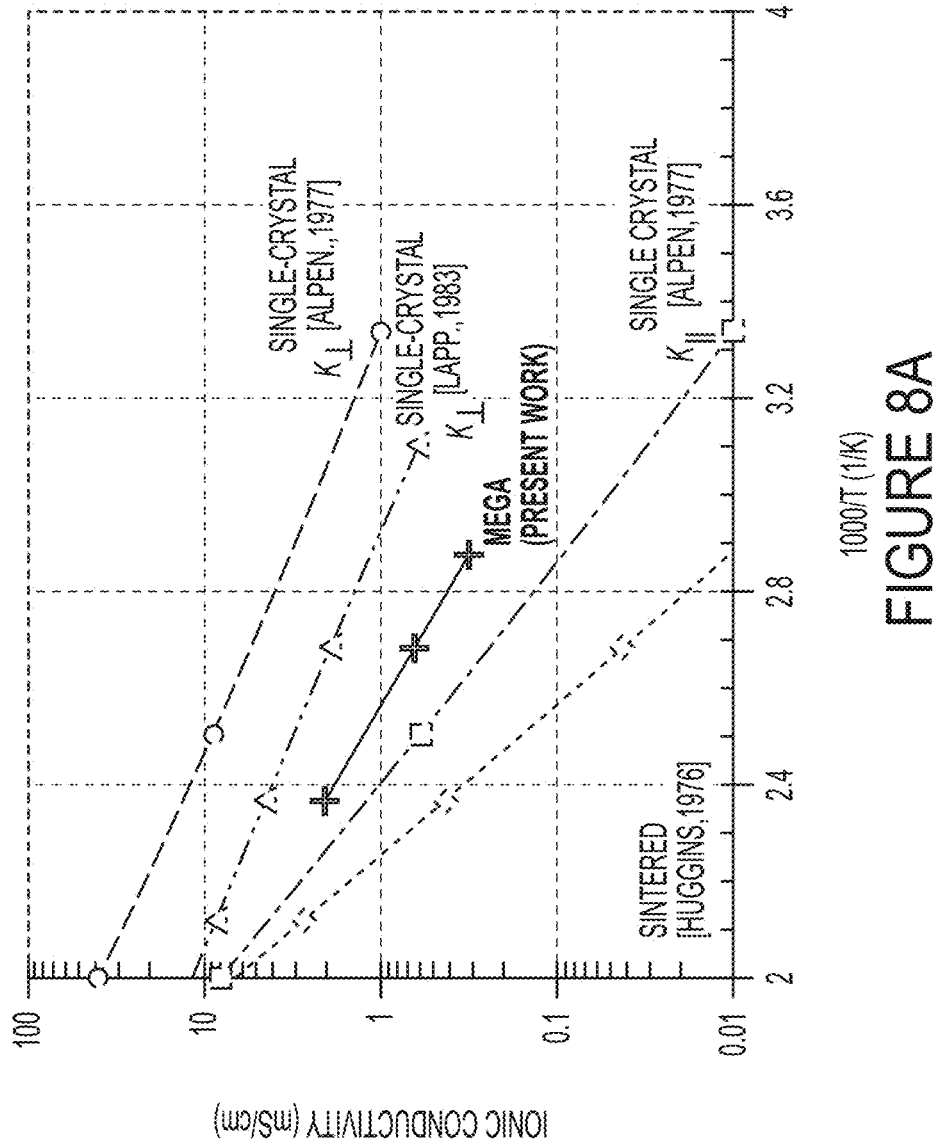
FIGS. 8A and 8B show a comparison of preliminary electrochemical impedance spectroscopy measurements of $Li_3N$ ionic conductivity with existing literature and the crystal structure of α-$Li_3N$, respectively.
Figure 8B:
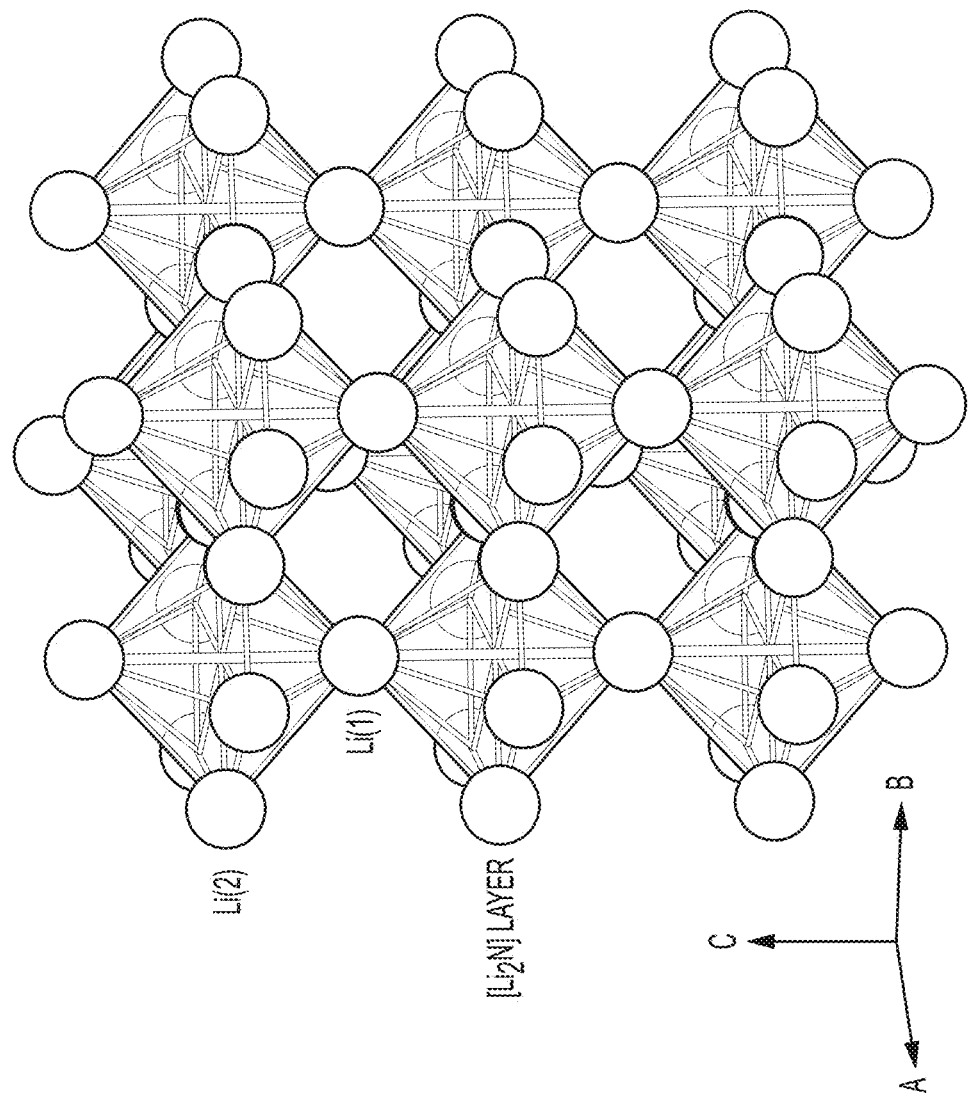

FIG. 8A is a graph showing a comparison of preliminary electrochemical impedance spectroscopy measurements of $Li_3N$ ionic conductivity with existing literature. FIG. 8B illustrates the crystal structure of $\alpha$-$Li_3N$.

One feature of the systems and methods of the present disclosure is the rapid nitride ion ($N^{3-}$) transport in a solid electrolyte at moderate temperatures, which enables efficient $NH_3$ generation while avoiding parasitic $H_2$ evolution or thermal decomposition of $NH_3$. This is due to the unique crystal structure of $\alpha$-$Li_3N$ (FIG. 8B), which constitutes sheets of $(Li_2N)^-$ and mobile $Li^+$ channels. As a result, the material was previously thought of as a single-ion conductor. Lithium nitride has been known to be an effective $Li^+$ conductor, and solid-state $N^{3-}$ transport has been demonstrated in proof-of-concept experiments discussed in the Examples section of this application. The disruptive manufacturing approach may involve roll-to-roll assembly of Li metal and the other layers into a complete membrane electrode assembly (MEA), followed by in situ membrane formation by Li nitridation:

$$3Li + \tfrac{1}{2}N_2 \rightarrow Li_3N.$$

This will dramatically reduce fabrication costs by avoiding more expensive membrane fabrication methods such as tape-casting and vapor deposition, enabling the fabrication of a solid ceramic ion conductor as a fully dense membrane with ionic conductivity and reduced gas permeability.

This also enables the fabrication of membranes at thickness and processing conditions that allow for the characteristic length of a crystalline grain to be similar to or greater than the thickness of the film, such that conductivity approaches single-crystalline conductivity.

The ability to fabricate the membrane inside the electrochemical cell, such that this fragile material does not need further handling and is mechanically protected by the cell, enables the use of much thinner membranes than would otherwise be possible, which in turn decreases the resistance of the cell, increases the current density and efficiency, and reduces the both the capital cost and electricity cost of the chemical that the stack produces.

The systems and methods of the present application have numerous advantages over the prior art. One advantage is that the modular electrochemical stack has no moving parts (low maintenance costs) and scales very well with size (high efficiency at any size). This makes it particularly well suited for small scale ammonia generation (e.g., at flared gas sites and wind farms).

Another advantage is that nitride ion transport prevents parasitic $H_2$ evolution along with $N_2$ reduction.

An additional advantage is that current density may be comparable to Haber-Bosch by membrane optimization (using thinner membrane, reduced polycrystallinity) and improvements in $N_2$-reduction catalysts.

A further advantage is that the metal nitride provides a solid barrier which prevents $H_2$ crossover and poisoning of the $N_2$-selective Ru catalyst.

Still another advantage is the process operates at intermediate temperatures and can potentially avoid thermodynamic decomposition of ammonia.

Yet another advantage is that the simple manufacturing method avoids the need for expensive tape casting or chemical vapor deposition fabrication processes.

The following examples are provided to illustrate the devices and methods of the present disclosure. The examples are merely illustrative and are not intended to limit the disclosure to the materials, conditions, or process parameters set forth therein.

EXAMPLES

Formation of Lithium Nitride Layer

Figure 9:
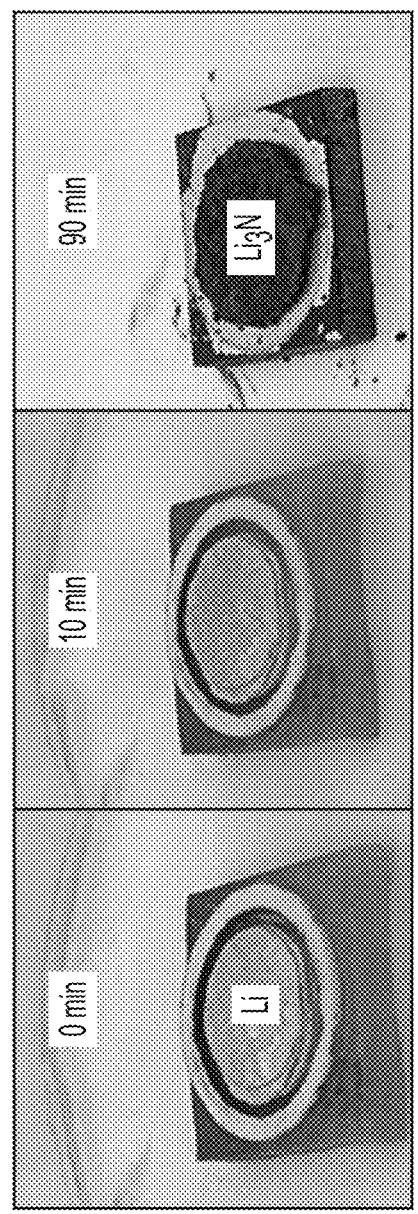
FIG. 9 includes photographs showing the synthesis of a 1.5 mm thick lithium nitride membrane by reacting Li in 1 bar $N_2$ at 220° C. in which a prototype electrochemical stack (3 $cm^2$ active area) was fabricated using a cathode catalyst (4 mg/$cm^2$ Pt/Ru), an anode catalyst (4 mg/$cm_2$ Pt) and Li metal. The Li metal was reacted under passage of $N_2$ to form the lithium nitride membrane in situ.

An experiment was conducted to demonstrate the feasibility of membrane fabrication by reacting lithium (Li) metal in a nitrogen ($N_2$) atmosphere (1 bar) at 220° C. At this temperature, the lithium rapidly reacted with nitrogen (Li+ 3/2 $N_2 \rightarrow Li_3N$) to yield a dark colored product. The results are shown in FIG. 9 which shows a lithium metal layer prior to exposure to the nitrogen environment (0 minutes; left photograph); after 10 minutes of exposure, before the lithium nitride layer was fully formed (middle photograph); and after the formation of the lithium nitride layer (90 minutes; right photograph). The lithium nitride membrane had a thickness of about 1.5 mm.

Fabrication of Prototype Electrochemical Stack

A prototype electrochemical stack was fabricated using a cathode catalyst (4 mg/cm$^2$ Pt/Ru), an anode catalyst (4 mg/cm$^2$ Pt), and lithium metal. The lithium metal was reacted under the passage of nitrogen gas to form the lithium nitride membrane in situ. Forming the membrane in situ is advantageous because the lithium metal layer is more flexible and simplifies assembly, whereas the lithium nitride layer is less flexible, more difficult to bend, and more likely to be damaged if assembly is performed after the membrane has formed.

Ammonia Generation and Nitrogen Evolution Using Electrochemical Stack

Experiments were performed to assess the feasibility of the proposed electrochemical stack for ammonia generation. The temperature dependence of the ionic conductivity is compared to existing literature data in FIG. 8A. It is known that single-crystal $Li_3N$ has a highly anisotropic conductivity. The preliminary membrane has an overall conductivity that has an intermediate value between that of the parallel (cross-plane) and perpendicular (in plane) ionic conductivities. It is also noted that the electronic conductivity of the material is at least $10^4\times$ higher, indicating this to be a pure ionic conductor.

Figure 10:
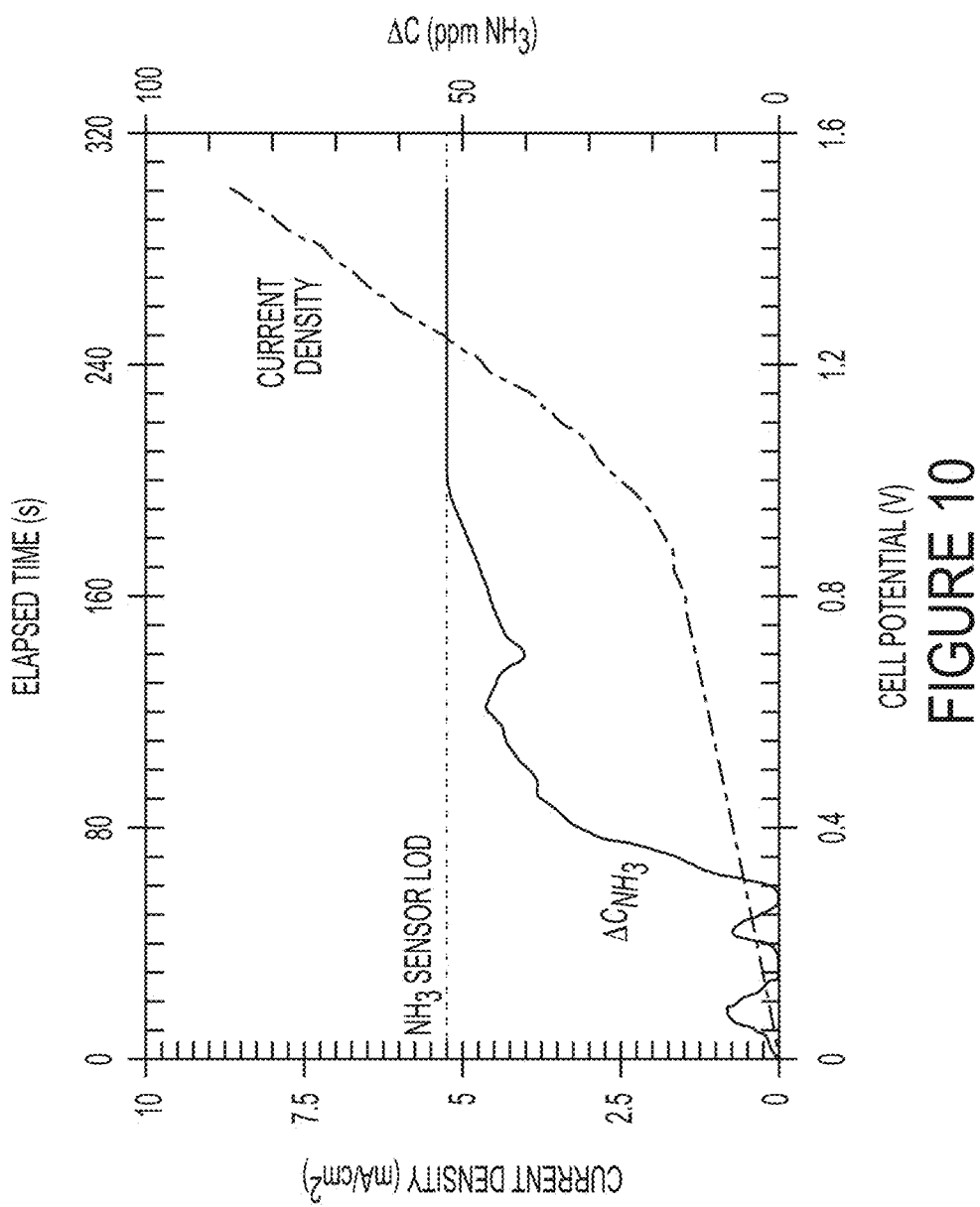
FIG. 10 illustrates cyclic voltammogram (10 mV/s) demonstrating $NH_3$ synthesis at 180° C. in a preliminary cell operated with Pt—Ru catalyst ($N_2$) and Pt catalyst ($H_2$). The $NH_3$ produced was detected using a 100 ppm sensor, which saturated at higher values of applied potential.
Figure 11:
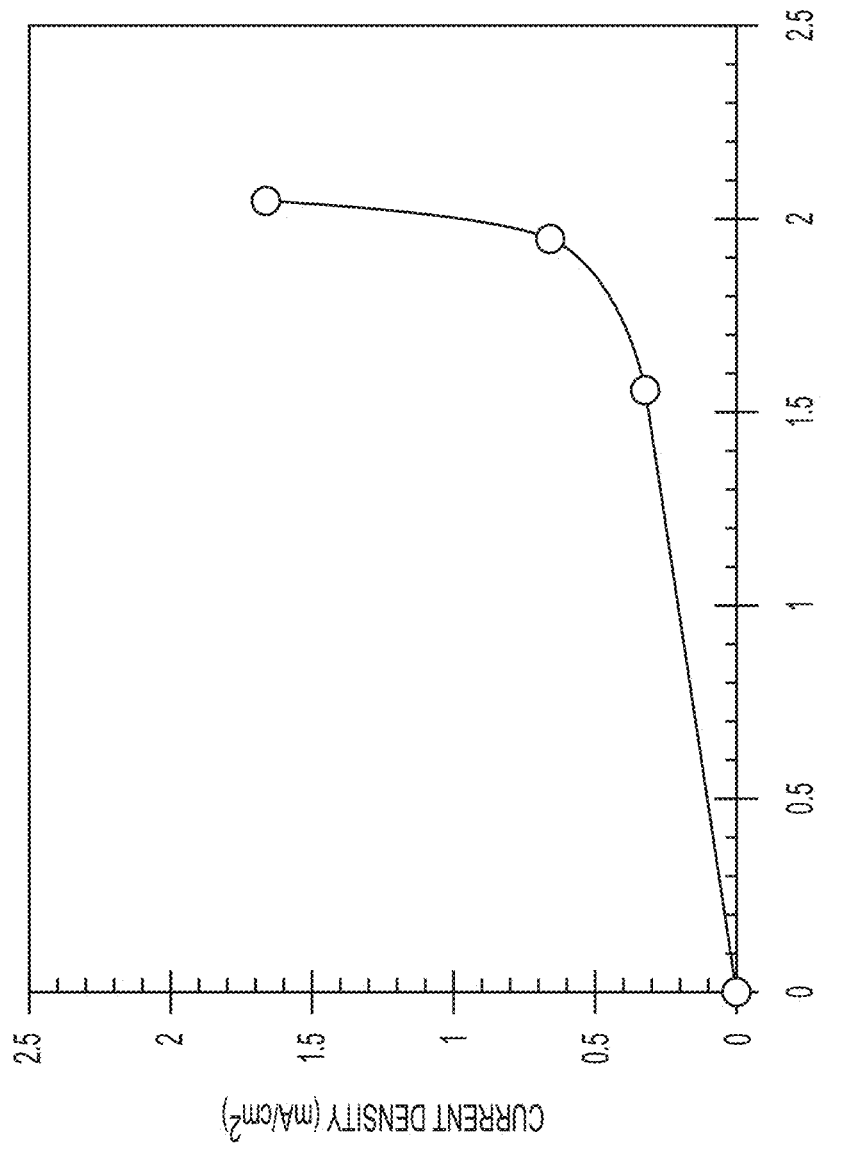
FIG. 11 is a graph showing some of the results of the proof-of-concept demonstration for nitrogen generation.

The proof of concept experiments to demonstrate ammonia generation and nitrogen evolution were performed using a 3 cm$^2$ electrochemical stack. Ammonia was generated using a feed of $H_2$ (5.07% in Ar, 80 mL min$^{-1}$) and $N_2$ (100 mL min$^{-1}$) at 180° C. The ammonia produced was detected using an electrochemical ammonia sensor (100 ppm detection limit). The experimental results conclusively demonstrate the synthesis of ammonia at rates sufficient enough to saturate the ammonia sensor. The maximum current obtained was 8.64 mA/cm$^2$ at 1.5 V, which corresponds to an ammonia synthesis flux of 30 nmol cm$^{-2}$ s$^{-1}$ (90% faradaic efficiency). The results of the nitrogen generation experiments (performed using a different cell) demonstrate a maximum current density of 2 mA/cm$^2$ is attained at a potential of 2.1 V. FIG. 10 is a cyclic voltammogram (10 mV/s) demonstrating the results. FIG. 11 is a graph showing some of the results of the proof-of-concept demonstration for nitrogen generation.

In-Situ Reaction and Membrane Electrode Assembly

Figure 12:
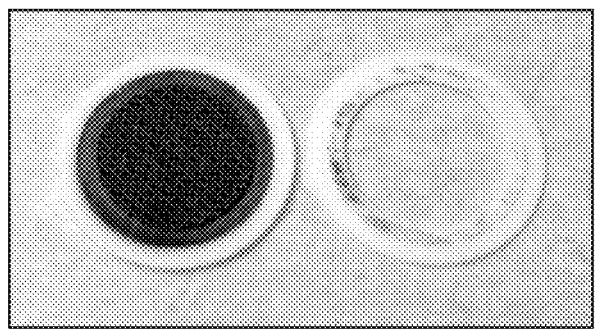
FIG. 12 is a photograph of a portion of a disassembled, layered electrochemical cell formed in accordance with one of the examples of the present disclosure.

A Swagelok cell was fabricated using a ¾" ID compression fitting, stainless steel current collector with gas inlet and outlet. FIG. 12 is a photograph of a portion of a disassembled, layered electrochemical cell formed by sandwiching a Li metal sheet (250 μm thick) between an appropriate catalyst (4 mg/cm$^2$ Pt—Ru catalyst) and gasket (380 μm Teflon). When heated at an appropriate temperature (240° C. on hot plate), the nitridation reaction rapidly converted the Li metal into lithium nitride, which was obtained as a 270 μm thick purple-red disc. The lithium nitride with the catalyst and gasket represents a repeating unit in a multilayer electrochemical stack.

Nitrogen Compression Experiment

Figure 13:
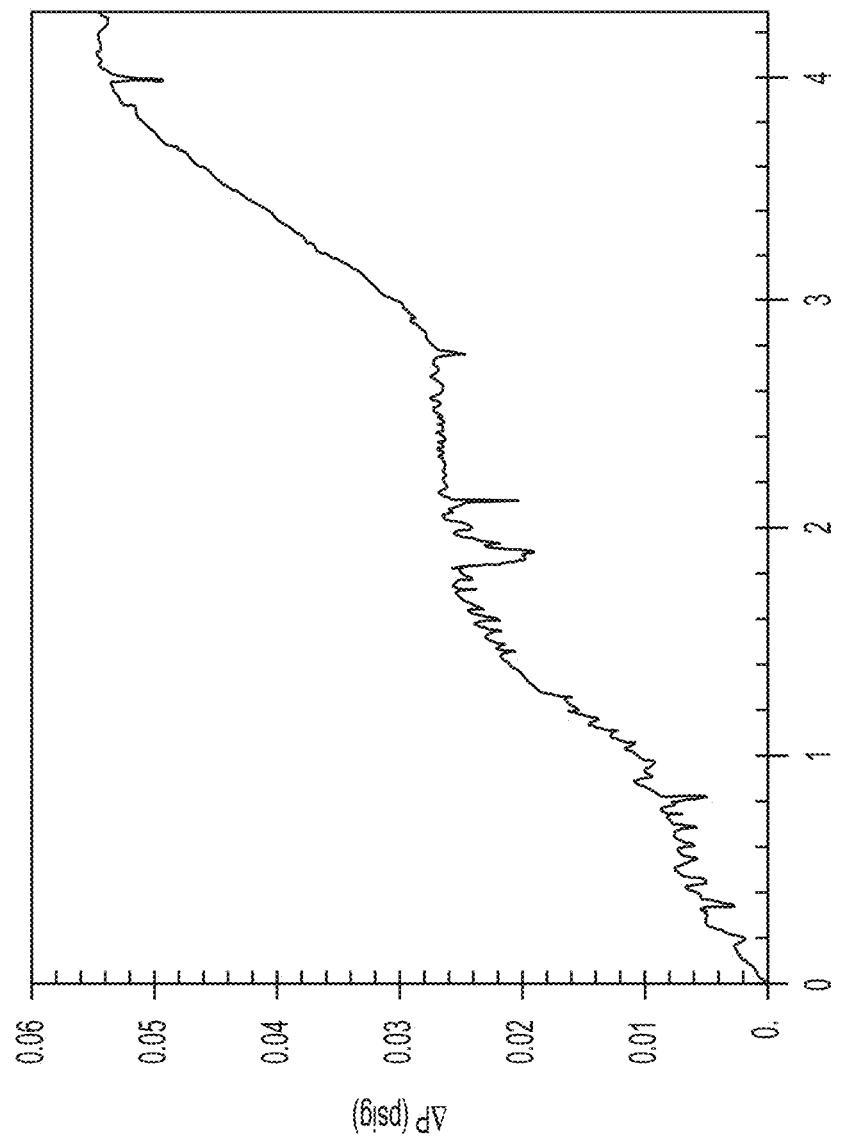
FIG. 13 is a graph showing the change in pressure over time when an electric field was applied to the device of FIG. 12.
Figure 14:
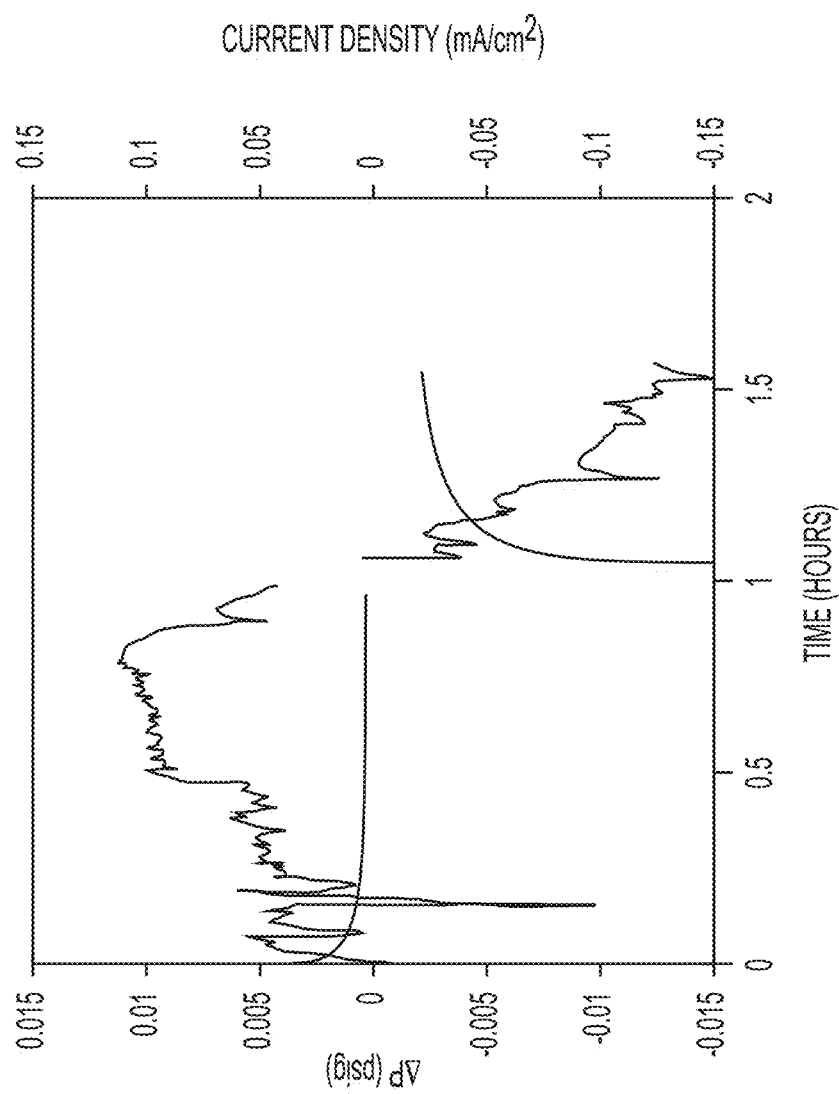
FIG. 14 is a graph showing the change in pressure over time when the electric field applied in FIG. 13 was reversed.

The Swagelok cell was set up as a symmetric cell ($N_2|Li_3N|N_2$), operated at a temperature of 125-150° C. with an ambient pressure of 0.77 psi being applied on the downstream side. When an electric field was applied, the pressure of nitrogen gas increased in the downstream gas chamber, indicating that $N_2$ was being reduced, transported across the lithium nitride membrane and re-oxidized back to $N_2$. These results are shown in FIG. 13. When the electric field was reversed, the pressure decreased as nitrogen was removed from the chamber of interest. These results are shown in FIG. 14. This satisfactorily indicates that the system can be used to transport and compress nitrogen gas.

Effect of Thermal and Chemical Profiles on Membrane Formation

During membrane formation, the thermal and chemical (gas) profiles can be adjusted/optimized to ensure proper formation. Changing the temperature and/or gas supplied to the stack during the formation process may be beneficial.

Figure 15:
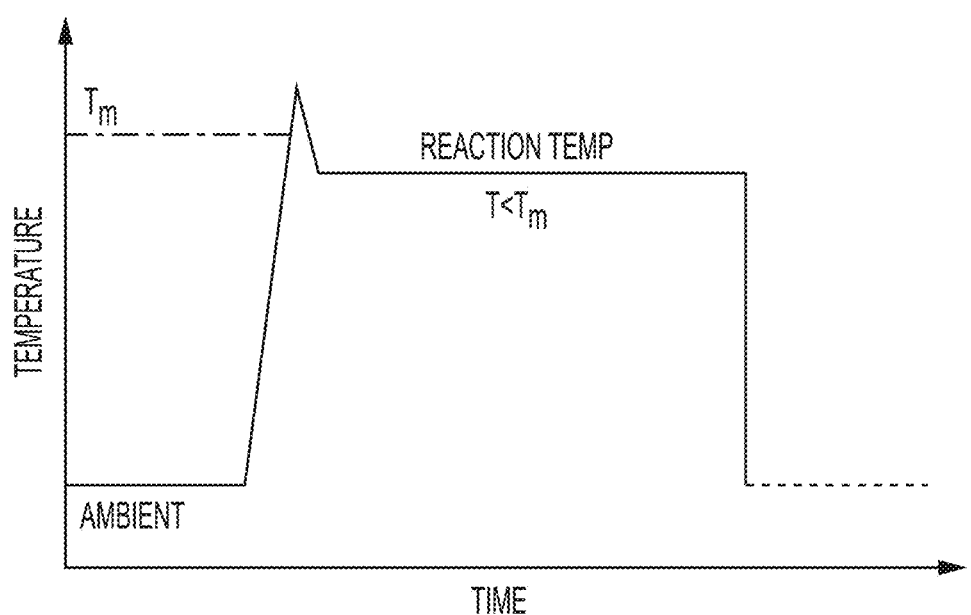
FIG. 15 illustrates an exemplary thermal profile in accordance with some embodiments of the present disclosure.
Figure 16:
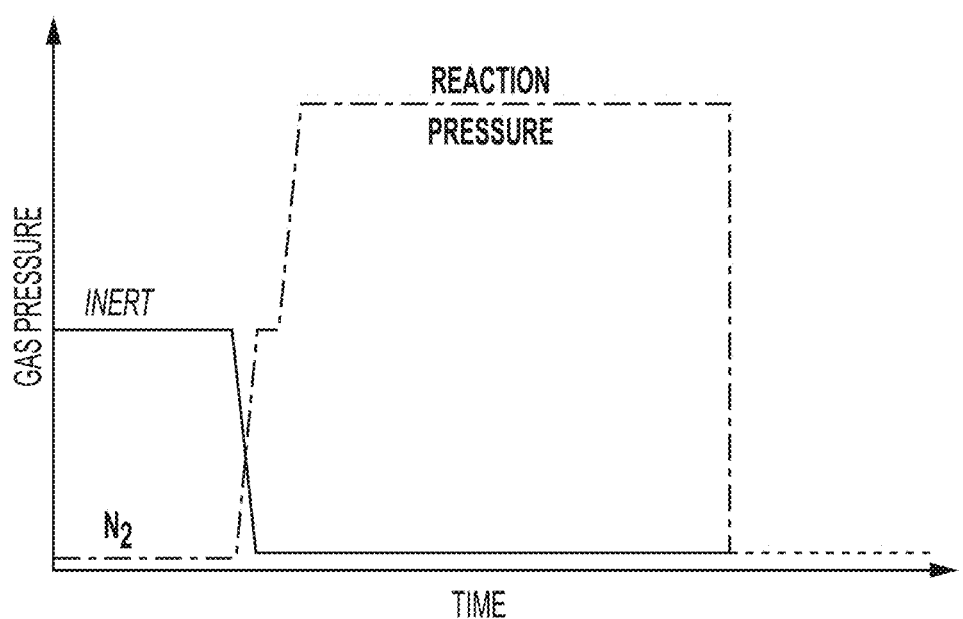
FIG. 16 illustrates an exemplary chemical (gas) profile in accordance with some embodiments of the present disclosure.

For example, the temperature profile of FIG. 15 includes a short ramp to a temperature modestly higher (<10° C.) than the melting point of the metal layer. This ensures that partial melting or deformation of the metal surface and ensure improved contact between the catalyst and membrane without deforming the bulk membrane structure. The membrane is then rapidly cooled to a temperature just below the metal melting point. Simultaneously, the reactant gas pressure is increased to ensure complete conversion of the membrane. Optionally, an inert gas, such as argon, may be used when the membrane is not actively undergoing nitridation as depicted in FIG. 16.

Microstructure of Lithium Nitride Membranes Produced In Situ

Figure 17:
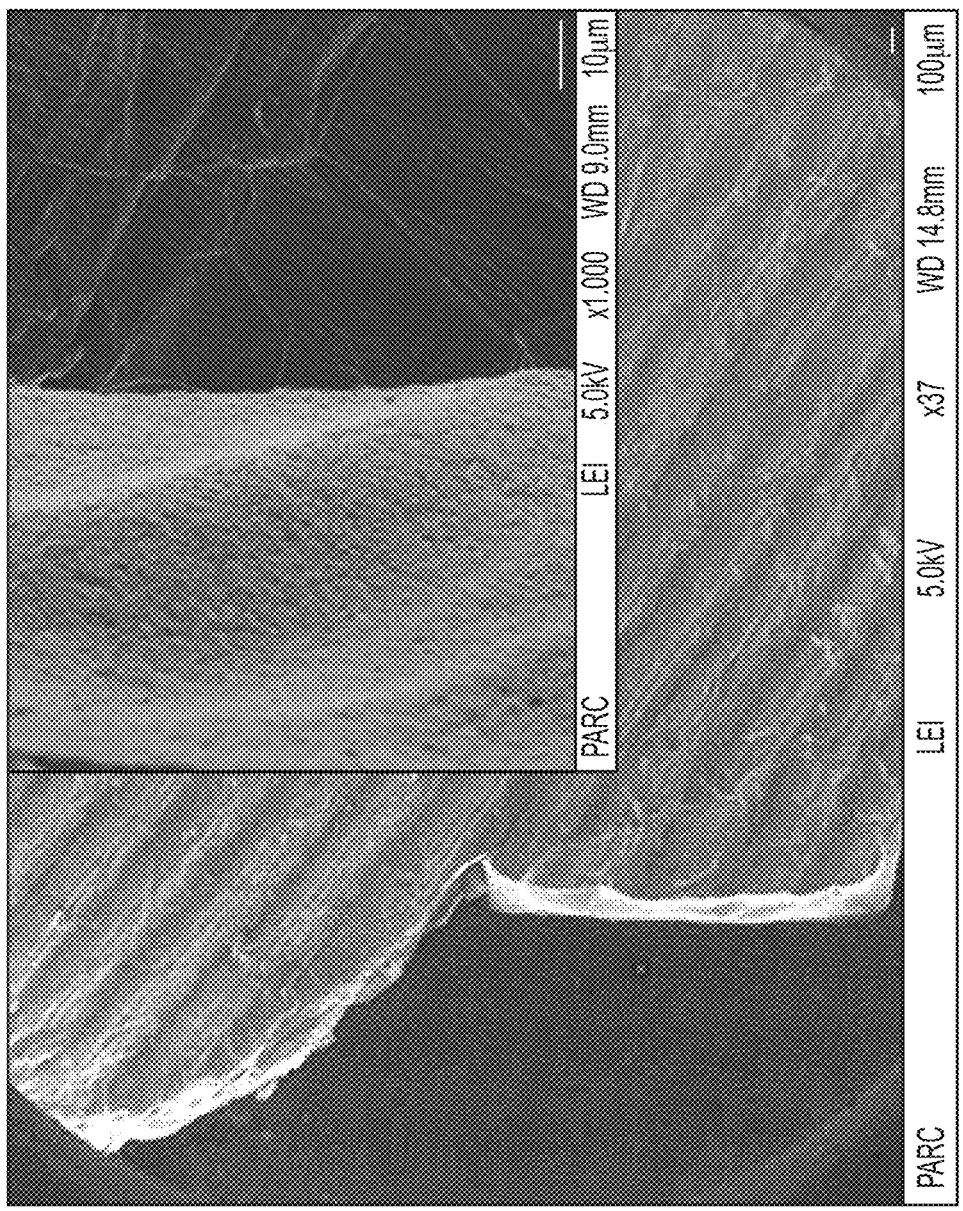
FIG. 17 in a scanning electron microscope (SEM) image of a membrane produced according to one of the examples at 37× magnification and 1000× magnification (inset).
Figure 18:
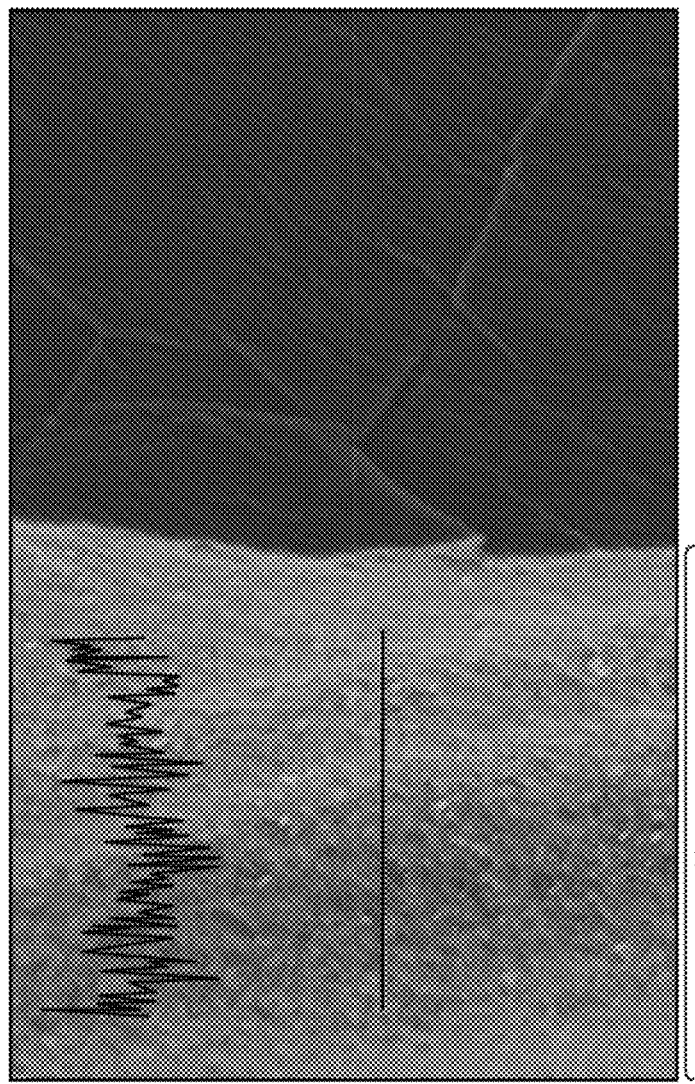
FIG. 18 is an EDX linescan of nitrogen content across a cross-section of a membrane made according to one of the examples.

Particular examples of in situ nitrided lithium nitride membranes are illustrated in FIGS. 17 and 18. FIG. 17 includes SEM micrographs of the larger membrane (37× magnification) and (inset) a closer view (1000× magnification) of its cross-section. Energy dispersive X-ray (EDX) analysis (FIG. 18) of the nitrogen content in the membrane demonstrates consistent nitridation was achieved across the membrane thickness. This particular membrane was synthesized at a fixed reaction temperature of 185° C. and 50 mm $N_2$ gauge pressure. The reaction temperature was maintained at slightly higher than the melting point of Li metal (180.5° C.), and the presence of $N_2$ led to the formation of a lithium nitride solid film which helped ensure that the shape of the membrane was not deformed.

Faradaic Efficiency and Ammonia Flux

Figure 19:
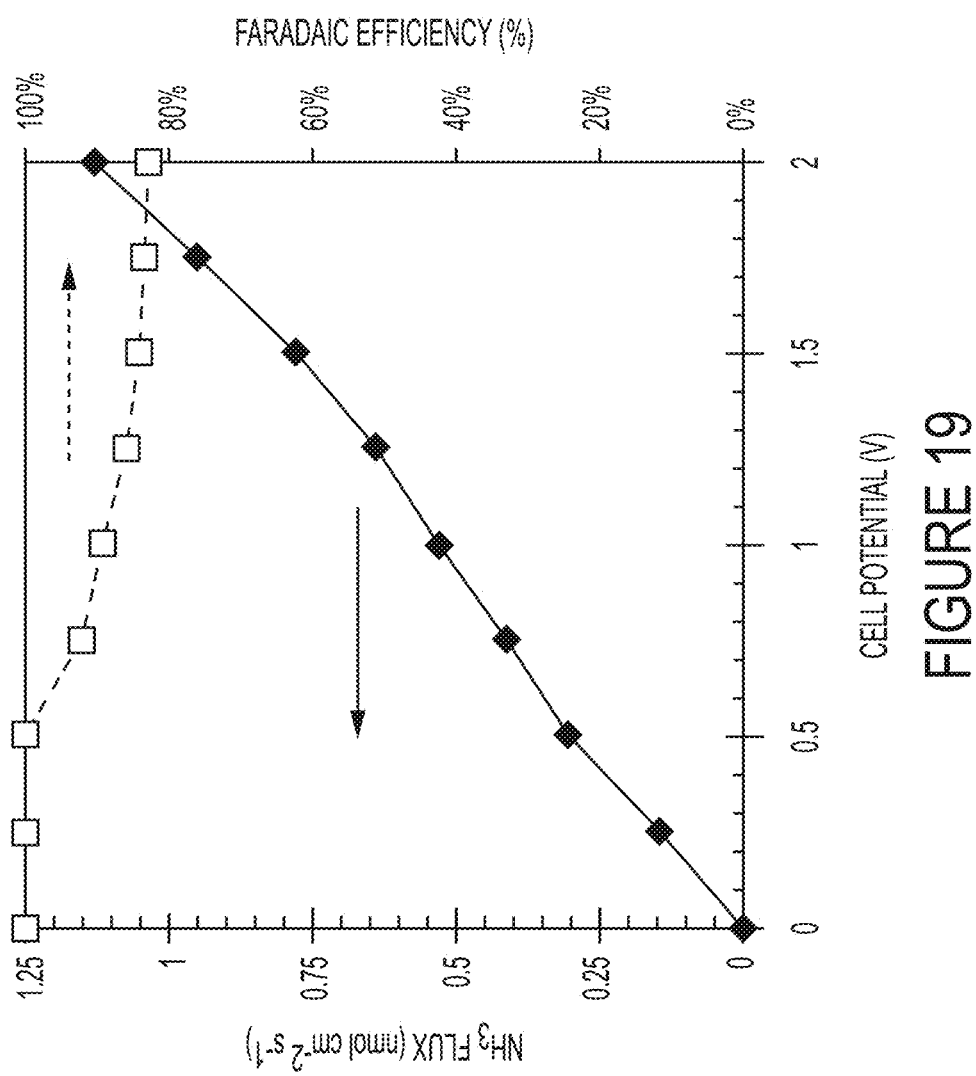
FIG. 19 is a graph illustrating Faradaic efficiency and ammonia flux in an electrochemical cell made in accordance with one of the examples.

The Faradaic efficiency for ammonia synthesis was determined in a $H_2|Li_3N|N_2$ electrochemical cell operated at 87° C. The potential was increased in steps of +0.25 V, and the current density recorded for at least 10 minutes per step. Upon completion of the experiments, $H_2$ flow was replaced with $N_2$, and the same voltage stepping experiment repeated in a symmetric $N_2|Li_3N|N_2$ electrochemical cell. The baseline current in the "symmetric cell" was subtracted from the current when operated using $H_2$, and used to estimate the Faradaic efficiency for ammonia production. The results are shown in FIG. 19. The Faradaic efficiency was nearly 100% when operated at about 0.5 V, and levels off at a value of 83% at 2V, demonstrating ammonia synthesis.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for forming an electrochemical stack comprising:
    assembling a precursor stack comprising:
        a metal layer comprising a reactant metal;
        a first current collector on a first side of the metal layer; and
        a second current collector on a second side of the metal layer;
    introducing a reactant gas into the precursor stack, wherein the reactant gas reacts with the reactant metal to form a solid electrolyte membrane;
    wherein the solid electrolyte membrane is formed in situ after the assembly of the precursor stack.

2. The method of claim 1, wherein the solid electrolyte membrane comprises a nitride; and wherein the reactant metal comprises at least one element selected from the group consisting of lithium (Li), sodium (Na), magnesium (Mg), calcium (Ca), strontium (Sr), and barium (Ba).

3. The method of claim 1, wherein the reactant metal is lithium.

4. The method of claim 1, wherein the reactant gas comprises at least one gas selected from the group consisting of nitrogen ($N_2$) and ammonia ($NH_3$).

5. The method of claim 1, wherein the solid electrolyte membrane comprises a metal oxide or a mixed-metal oxide.

6. The method of claim 5, wherein the reactant metal comprises one or more elements selected from the group consisting of zirconium (Zr), yttrium (Y), scandium (Sc), cerium (Ce), and gadolinium; and wherein the reactant gas is oxygen ($O_2$) or ozone ($O_3$).

7. The method of claim 1, wherein the solid electrolyte membrane comprises a fluoride, a sulfide, or an iodide; and wherein the reactant gas comprises fluorine ($F_2$), iodine ($I_2$), or hydrogen sulfide ($H_2S$).

8. The method of claim 1, wherein the reactant gas is introduced to the electrochemical stack at a temperature in the range of from 25° C. to 800° C.

9. The method of claim 1, wherein the solid electrolyte membrane comprises lithium nitride; and wherein the reactant gas is introduced to the electrochemical stack at a temperature in the range of from 100° C. to 325° C.

10. The method of claim 1, wherein the reactant gas is introduced to the electrochemical stack at a pressure in the range of from 1 bar to 10 bar.

11. The method of claim 1, wherein the precursor stack further comprises a first catalyst electrode layer and a second catalyst electrode layer; wherein at least one of the first catalyst electrode layer and the second catalyst electrode layer comprises a ruthenium (Ru) catalyst.

12. A method for forming a solid electrolyte membrane, the method comprising in sequence:
    providing an electrochemical cell precursor comprising: a metal layer comprising a reactant metal, a first current collector on a first side of the metal layer, and a second current collector on a second side of the metal layer; and
    providing a reactant gas to react with the reactant metal in the metal layer to form the solid electrolyte membrane in situ in the electrochemical cell precursor.

13. The method of claim 12, wherein the reactant metal is selected from the group consisting of lithium (Li), magnesium (Mg), aluminum (Al), calcium (Ca), strontium (Sr), barium (Ba), or a mixture thereof.

14. The method of claim 12, wherein the reactant metal is lithium.

15. The method of claim 12, wherein the reactant gas comprises at least one gas selected from the group consisting of nitrogen ($N_2$) and ammonia ($NH_3$).

16. The method of claim 1, wherein the precursor stack further comprises a first catalyst layer between the first current collector and the metal layer and a second catalyst layer between the second current collector and the metal layer.

17. A method for forming an electrochemical stack comprising:
    introducing a reactant gas into an assembled precursor stack;
    wherein the assembled precursor stack comprises a metal layer comprising a reactant metal, a first current collector on a first side of the metal layer, and a second current collector on a second side of the metal layer;
    wherein the reactant gas reacts with the reactant metal to form a solid electrolyte membrane in situ;
    wherein the solid electrolyte membrane allows at least one type of ion selected from the group consisting of nitride ions, sulfide ions, fluoride ions, and iodide ions to pass therethrough.

18. The method of claim 1, wherein the reactant gas only reacts with the reactant metal.

19. The method of claim 16, wherein the precursor stack further comprises:
    a first microporous layer between the first catalyst layer and the first current collector; and
    a second microporous layer between the second catalyst layer and the second current collector.

20. The method of claim 1, wherein the first current collector and the second current collector are in physical contact with the solid electrolyte membrane.

* * * * *